United States Patent
Radford et al.

(10) Patent No.: US 11,936,256 B2
(45) Date of Patent: Mar. 19, 2024

(54) FLUX-MNEMONIC PERMANENT MAGNET SYNCHRONOUS MACHINE AND MAGNETIZING A FLUX-MNEMONIC PERMANENT MAGNET SYNCHRONOUS MACHINE

(71) Applicant: Jacobi Motors LLC, Webster, TX (US)

(72) Inventors: Nicolaus Radford, Webster, TX (US); Mohammadreza Barzegaranbaboli, Webster, TX (US); Ahmed Morsy, Webster, TX (US)

(73) Assignee: Jacobi Motors, LLC, Webster, TX (US)

( * ) Notice: Subject to any disclaimer, the term of this patent is extended or adjusted under 35 U.S.C. 154(b) by 257 days.

(21) Appl. No.: 17/237,585

(22) Filed: Apr. 22, 2021

(65) Prior Publication Data

US 2021/0336519 A1    Oct. 28, 2021

Related U.S. Application Data

(60) Provisional application No. 63/015,270, filed on Apr. 24, 2020.

(51) Int. Cl.
*H02K 21/12* (2006.01)
*H02K 29/12* (2006.01)
*H02P 6/182* (2016.01)

(52) U.S. Cl.
CPC ............ *H02K 21/12* (2013.01); *H02K 29/12* (2013.01); *H02P 6/182* (2013.01)

(58) Field of Classification Search
CPC ........ Y02T 10/12; H02K 21/02; H02K 21/12; H02K 21/14; H02K 2213/09; H02K 29/12;

(Continued)

(56) References Cited

U.S. PATENT DOCUMENTS

| | | | | |
|---|---|---|---|---|
| 2009/0261774 A1* | 10/2009 | Yuuki | ...................... | H02P 21/10 310/156.01 |
| 2010/0327787 A1* | 12/2010 | Sakai | ...................... | H02P 21/22 318/400.09 |
| 2012/0217834 A1* | 8/2012 | Lutz | ..................... | H02K 1/2753 29/598 |

FOREIGN PATENT DOCUMENTS

| | | |
|---|---|---|
| DE | 102006006824 A1 | 8/2007 |
| GB | 2284104 A | 5/1995 |

OTHER PUBLICATIONS

H. Jia et al. "Variable flux Memory Motors: A Review" 2014 IEEE Conference and Expo, ITEC Asia-Pacific; pp. 1-6; Aug. 31, 2014 (6 pages).

(Continued)

*Primary Examiner* — Naishadh N Desai
(74) *Attorney, Agent, or Firm* — David L. Cohen

(57) ABSTRACT

A flux-mnemonic permanent magnet synchronous machine (FMPMSM) includes: an annular stator having a winding; a rotor disposed concentric with the stator; and a power inverter for dispensing an excitation current and at least one current pulse. The rotor includes: at least two circumferentially magnetized adjustable permanent magnets, each permanent magnet having two poles normal to an air gap between the stator and rotor; and one or more flux adjusters adjacent to one or more magnet poles of the permanent magnets. A polarization ratio of magnetization of at least one of the permanent magnets is adjustable during operation of the FMPMSM by application of the at least one current pulse.

21 Claims, 18 Drawing Sheets

(58) Field of Classification Search
CPC ...... H02P 21/22; H02P 6/182; F02B 27/0221; F02B 27/0247; F02B 27/02
See application file for complete search history.

(56) References Cited

OTHER PUBLICATIONS

International Search Report issued in International Application No. PCT/US2021/028869, dated Aug. 3, 2021 (5 pages).
Written Opinion issued in International Application No. PCT/US2021/028869; dated Aug. 3, 2021 (12 pages).

* cited by examiner

FLUX-MNEMONIC PERMANENT MAGNET SYNCHRONOUS MACHINE AND MAGNETIZING A FLUX-MNEMONIC PERMANENT MAGNET SYNCHRONOUS MACHINE

CROSS REFERENCE TO RELATED APPLICATIONS

This Application claims priority, pursuant to 35 U.S.C. § 119(e), to U.S. Provisional Application No. 63/015,270 entitled, "FLUX-MNEMONIC PERMANENT MAGNET SYNCHRONOUSMACHINE AND MAGNETIZING A FLUX-MNEMONIC PERMANENT MAGNET SYNCHRONOUS MACHINE," filed on Apr. 24, 2020. The contents of which are hereby incorporated by reference in its entirety.

BACKGROUND

Permanent magnet (PM) synchronous machines are useful in a wide variety of applications due to their high torque density, high efficiency, no need for active rotor cooling, and minimal need for rotor maintenance. These advantages make a PM synchronous machine attractive when compared to wound rotor synchronous machine. One advantage to wound rotor synchronous machines however is that the induced voltage in the stator windings can be controlled by field current. When the speed of a wound rotor synchronous machine increases, its field current can be adjusted to keep constant or decrease the stator induced voltage (known as the back-emf). A conventional PM synchronous machine does not have this advantage. Rather, as conventional PM synchronous machine speed increases, its back-emf voltage increases proportionally but without the ability to actively adjust this induced stator voltage. This inability to adjust back-emf leads to limitations on the maximum speed of a conventional PM synchronous machine imposed by constraints such as its winding insulation properties, maximum achievable conductor current density, and inverter voltage capacity.

Conventional PM synchronous machines have other limitations. The rotor of a conventional PM machine has a rigid magnetic structure that requires a fixed number of active stator and rotor poles. This prevents the ability to adjust the speed range of a given conventional PM synchronous machine by changing (adding or subtracting) the number of magnetic poles. Another disadvantage to conventional PM machines is that it is inefficient to adjust speed (beyond nominal speed) as such an adjustment would require the injection of additional current which leads to additional losses. Conventional PM machines that use permanent magnets constructed of materials having low Curie temperature limits also have the disadvantage that these materials can demagnetize at higher machine operating temperatures.

Some unconventional PM synchronous machines have sought to exploit advantages of PM synchronous machines while addressing limitations of conventional PM synchronous machines. The present invention generally relates to a type of unconventional PM synchronous machine, a flux-mnemonic permanent magnet synchronous machine (FMPMSM).

SUMMARY

One or more embodiments provide a flux-mnemonic permanent magnet synchronous machine (FMPMSM) that comprises: an annular stator having a winding; a rotor disposed concentric with the stator; and a power inverter for dispensing an excitation current and at least one current pulse. The rotor comprises: at least two circumferentially magnetized adjustable permanent magnets, each permanent magnet having two poles normal to an air gap between the stator and rotor; and one or more flux adjusters adjacent to one or more magnet poles of the permanent magnets. A polarization ratio of magnetization of at least one of the permanent magnets is adjustable during operation of the FMPMSM by application of the at least one current pulse.

One or more embodiments provide an FMPMSM having a derived internal voltage. The FMPMSM comprises: an annular stator having a winding; a rotor disposed concentric with the stator; a power inverter for dispensing a current pulse, wherein the power inverter has a voltage ($V_{ps}$) greater than the derived internal voltage; and an air gap between the stator and rotor. The rotor comprises: at least two circumferentially magnetized permanent magnets, each of the permanent magnets having two poles normal to an air gap between the stator and rotor; and a flux adjuster between the two poles of each of the permanent magnets. A magnetic flux density in the air gap is controllable by applying at least one current pulse from the power inverter to vary a polarization of magnetization of at least one of the permanent magnets at a first speed of the FMPMSM. The derived internal voltage limits a relationship between the magnetization state of the at least one permanent magnet and the first speed of the FMPMSM. According to one or more embodiments, the magnetic flux density in the FMPMSM is controllable during operation of the FMPMSM.

One or more embodiments provide a method of operating an FMPMSM comprising: an annular stator having a winding; a rotor disposed concentric with the stator; and a power inverter for dispensing an excitation current and at least one current pulse. The rotor comprises: at least two circumferentially magnetized permanent magnets, each of the permanent magnets having two poles normal to an air gap between the stator and rotor; and one or more flux adjusters adjacent to one or more poles of at least one of the permanent magnets. The method comprises: selecting a desired operational parameter having a first value; applying at least one current pulse from the inverter to set a magnetic flux linkage between the rotor and stator to achieve the first value of the desired operational parameter; selecting a second value of the desired operational parameter; and achieving the second value of the desired operational parameter by applying at least one second current pulse to adjust the magnetic flux linkage to a magnetization state corresponding to the second value.

One or more embodiments provide a method of operating an FMPMSM, the FMPMSM comprising: an annular stator having a winding; a rotor disposed concentric with the stator; and a power source controllable by an inverter for dispensing an excitation current and at least one current pulse, the inverter having a microcontroller. The rotor comprises: at least two circumferentially magnetized permanent magnets, each of the permanent magnets having two poles normal to an air gap between the stator and rotor; and a flux barrier between the poles of each of the permanent magnets. The method comprises: selecting a desired operational parameter having a first value; specifying a permissible range for the operational parameter; applying at least one first current pulse from the inverter to set a magnetic flux linkage between the rotor and stator to achieve the first value of the desired operational parameter; selecting a second value of the desired operational parameter; and applying at least one second current pulse from the inverter to adjust the magnetic flux linkage to a magnetization state corresponding to the second value. A difference between the first value and second value is within the specified permissible range for the operational parameter.

One or more embodiments provide to a real-time FMPMSM comprising a rotor with circumferentially magnetized permanent magnets, wherein the permanent magnets have a coercivity of less than 2000 Oe (150 kAmp/m).

One or more embodiments provide a method of regulating magnetic polarization of permanent magnets in a real-time FMPMSM using at least one current pulse having a duration of less than 3 ms.

One or more embodiments provide a method of changing a magnetic flux density in an air gap between a stator and a rotor in a real-time FMPMSM comprising permanent magnets, the method comprising applying at least one current pulse to adjust a magnetic operating point of the magnets, wherein the at least one current pulse has a duration of less than 3 ms.

One or more embodiments provide a mode of operation in which the air gap flux density is altered in real-time by changing the magnetic polarization of circumferentially magnetized rotor magnets through a full-scale continuum during machine operation. The polarization regulation may be fully regulated and may improve power output efficiency by moving and expanding the peak island of optimal efficiency within a torque-speed basis.

In one or more embodiments, depending on the operating point, increased torque demand is met through real-time, reprogramming of additional flux through the air gap by adjusting the magnetic operating point through short form, direct axis current pulses. Conversely, speed range augmentation may be achieved by diverting flux away from the air gap through magnetic short circuit regulation to reduce the resulting back-electromotive force (back emf) created at higher speeds.

The method of one or more embodiments uses only soft magnetic material over the entire useable range of air gap flux regulation using short form pulses. Therefore, the proposed design is hence full-scale variable.

DETAILED DESCRIPTION

Figure 1:
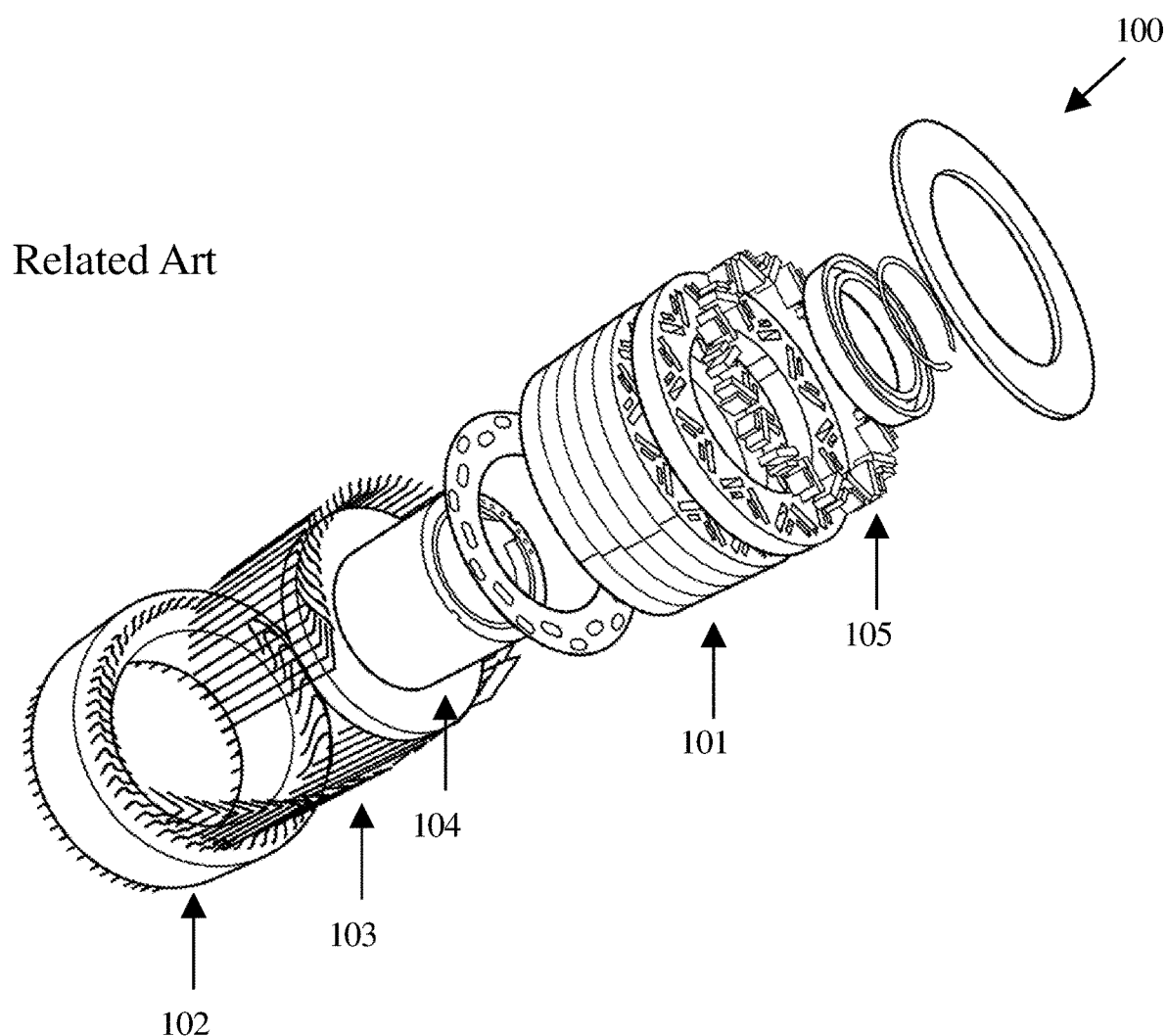
FIG. 1 shows a synchronous electric motor.

Specific embodiments of the invention will now be described in detail with reference to the accompanying figures. Like elements in the various figures are denoted by like reference numerals for consistency.

In the following detailed description of the embodiments of the invention, numerous specific details are set forth in order to provide a more thorough understanding of the invention. However, it would have been apparent of one of ordinary skill in the art that the invention may be practiced without these specific details. In other instances, well-known features have not been described in detail to avoid unnecessarily complicating the description.

FIG. 1 shows an exploded view of a conventional permanent magnet synchronous machine (100) including a rotor (101), an annular stator (102), and stator windings (103) arranged around a rotor hub (104). The machine may also include a terminal box for connecting input power, a cooling fan, one or more rotor position sensor(s), temperature sensors, liquid cooling houses, etc. The rotor (101) includes multiple poles, each including permanent magnets (PM) (105).

The conventional PM synchronous motor (100) operates via a balanced, three-phase AC input, in which each phase is advanced or delayed from the other two phases by 120 electrical degrees. Three-phase AC input may be provided or created using a DC-excited three phase inverter (i.e. from a battery). By applying the three-phase AC excitation to the synchronous motor, the stator windings create synchronous magnetic poles that interact with the magnetic fields of the PMs (105) and cause the rotor (101) to rotate with a fixed number of revolutions per minute (RPM) speed in a steady-state. The achievable RPM of the synchronous motor is fixed to limiting factors such as number of poles, available voltage, and air-gap magnetic flux (Bo) between the rotor and stator. The air-gap magnetic flux is provided and is fixed by the PMs. Synchronous motors have a wide range of applications in industrial, commercial, and residential, applications, such as fans, pumps, compressors, elevators, and refrigerators, industrial machinery, and electric vehicles.

In conventional PM machines, the air-gap magnetic flux ($B_\delta$) is fixed and is not adjustable. This results in a machine with a limited constant power speed range (CPSR), the speed range at which the drive of the machine can maintain a constant power with limited values of input voltage and motor current. A continuous direct axis (d-axis) flux-weakening (FW) current can be used to generate d-axis reaction magnetomotive forces (MMF) to suppress the PM fields to extend the speed range in a conventional PM machine. The speed range and operating efficiency of the machine remain limited though by the ratings (e.g., current, voltage) of the inverter and the overall power rating of the motor. To prevent demagnetization under normal operating conditions and to retain magnetic state throughout its operating life, a conventional PM machine is designed to have a magnet thickness that keeps the d-axis magnetomotive force (MMF) of the armature reaction below the magnetic coercive force ($H_i$) at the highest operating temperature of the machine. Using a d-axis FW current to generate d-axis MMFs to counteract the PM fields, however, poses the risk of potential demagnetization of the PM. In addition, machine efficiency is reduced due to the excitation loss associated with the d-axis FW current. Accordingly, a mechanical transmission system is typically needed to change a CPSR of a drive system due to the narrow CPSR for conventional PM synchronous machines. Use of a mechanical transmission system adds complexity and cost and reduces overall system-wide efficiency. Advanced methods such as described may only modestly extend the CPSR of these kinds of conventional PM synchronous machines. Overall, conventional PM machines are constrained and have significant disadvantages.

Many of these disadvantages are addressed in types of unconventional PM machines that provide more flexibility to adjust speed without sacrificing efficiency. In some types of unconventional PM machines, the air-gap magnetic flux (Bo) is not fixed. This adjustable air-gap magnetic flux in unconventional PM machines allows an extended CPSR compared to that of conventional PM machines. Increased torque can be generated by increasing the magnetization level of the machine and decreased torque can be achieved by reducing the magnetization level of the machine. Compared to a familiar conventional PM machine, an unconventional PM machine advantageously can provide a larger CPSR with fewer component restrictions.

While unconventional PM machines have these advantages, unconventional PM machines have magnetization constraints. For example, the positive d-axis current required to fully magnetize (i.e. increase MS to 100%) must be small enough to fall within power capability of an inverter. Another constraint may be the type of permanent magnets used. To avoid unintentional demagnetization of the permanent magnet, the heaviest load condition (i.e. maximum torque) must not force the magnet operating point beyond an inflection point on the flux density versus coercive force curve (the B-H curve) of the PM. To address this limitation, costly rare-earth or high coercive force magnets may be used.

In general, embodiments of the invention herein relate to a type of three phase, balance, AC-excited unconventional permanent magnet machine referred to herein as a flux-mnemonic permanent magnet synchronous machine (FMPMSM). In a FMPMSM, magnetization and demagnetization of adjustable permanent magnets (APMs) can be achieved by flowing one or more current pulses through the stator armature windings to produce one or more d-axis current pulses. The one or more current pulses can be adjusted (e.g., the polarization ratio of the current pulses can be adjusted) to control the magnetic flux density in the air gap (205). Accordingly, a polarization ratio of magnetization of the APMs may be adjustable during operation of the FMPMSM by application of the one or more current pulses. The air-gap magnetic flux linkage may be adjusted (i.e., increased or decreased) by increasing or decreasing the one or more d-axis current pulses. This permits torque to be adjusted as desired by increasing or decreasing the air-gap magnetic flux linkage generated by the d-axis current pulses. Accordingly, the APMs used in a FMPMSM can be varied by application of a d-axis current pulse. In a FMPMSM, magnetization of APMs can be adjusted (i.e., changed) during machine operation.

Figure 2A:
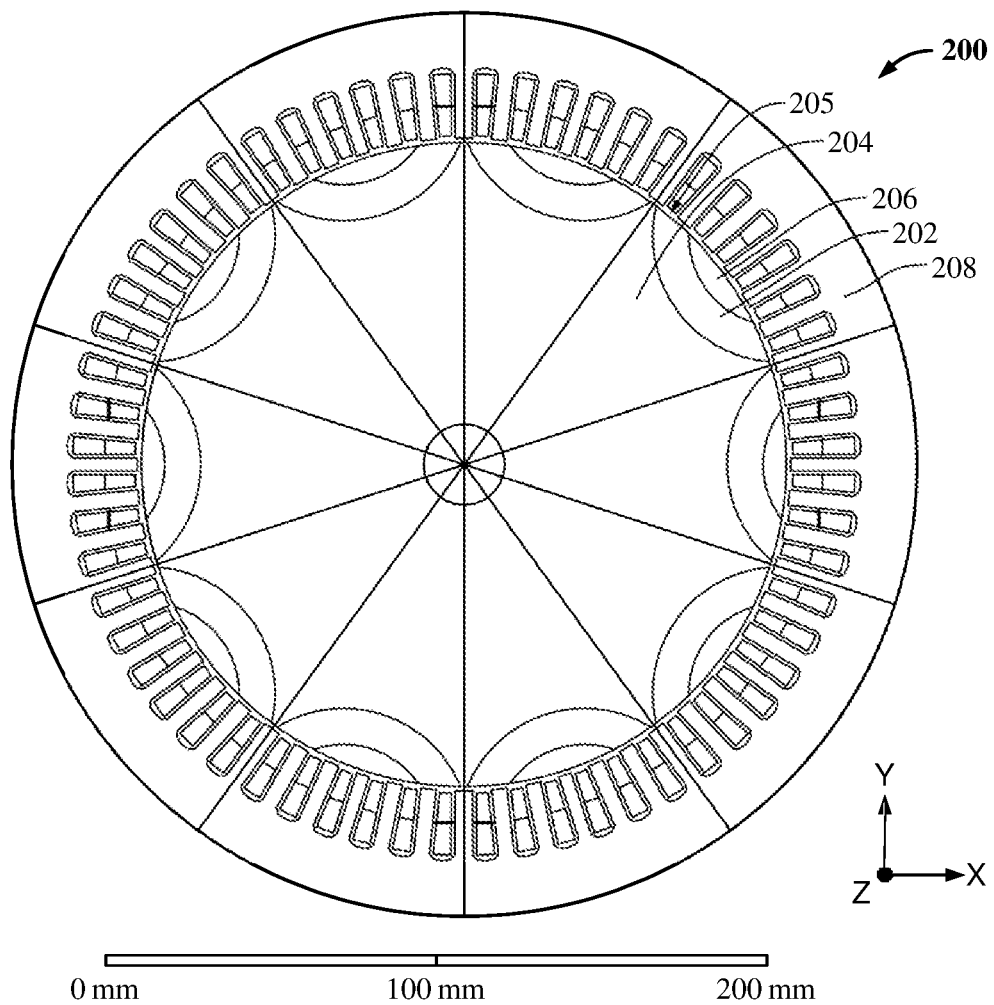
FIGS. 2A, 2B, 2C, 2D, and 2E show descriptive diagrams of a cross-section view of a FMPMSM or FMPMSM parts in accordance with one or more embodiments of the invention.
Figure 2B:
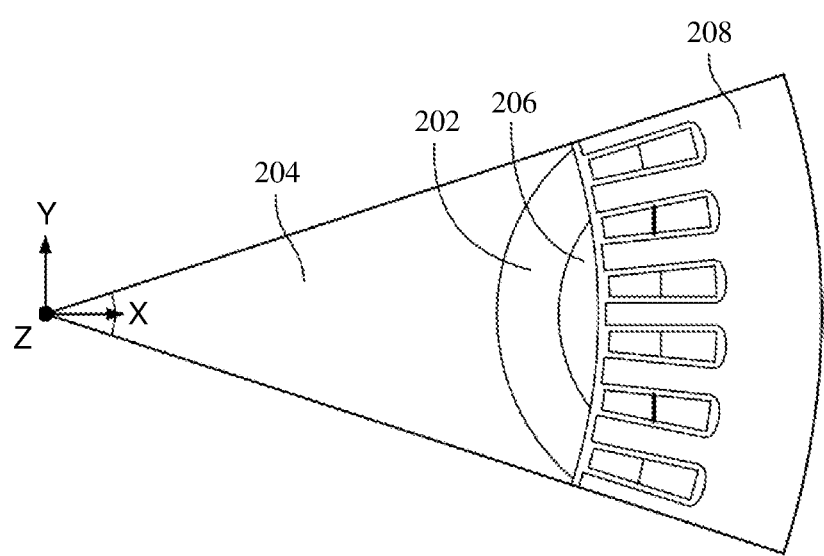
Figure 2C:
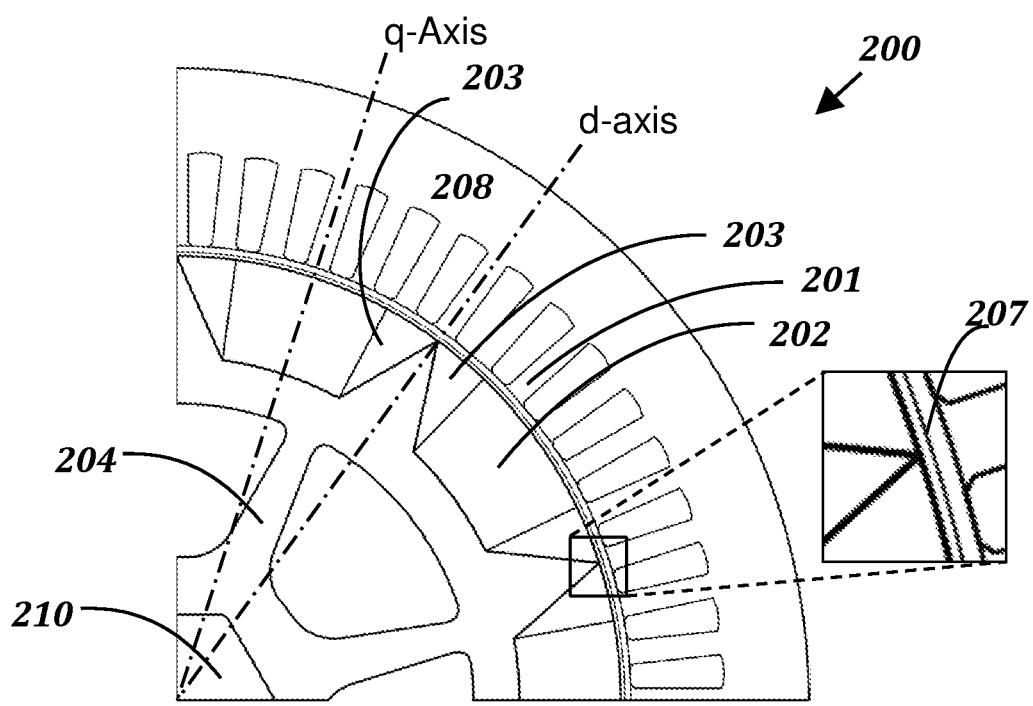

Each of FIGS. 2A, 2B, and 2C is a descriptive diagram of a cross-sectional view of an FMPMSM (200) in accordance with one or more embodiments of the invention. The FMPMSMs (200) of FIGS. 2A, 2B and 2C include a stator (208) that holds the stator windings in slots between adjacent stator teeth (201), and a rotor core (204). Rotor core (204) includes at least two circumferentially magnetized APMs (202), each magnet having two poles normal to the air gap (205) between the rotor and stator that are mounted on a rotor core (204).

The d-axis and q-axis (quadrature axis) are shown in FIG. 2C. D-axis is the axis in which the magnetic field of the rotor is at its peak. For example, d-axis in FIG. 2C is in the middle of the adjacent poles that is between magnetic gap parts (206) where the magnetic field of the rotor core (204) is the highest. Q-axis is away from the d-axis by 90 electrical degrees in phasing. For example, q-axis in FIG. 2C is between the APMs (202) of each of the poles where the magnetic field of the rotor core (204) is the lowest.

Figure 2D:
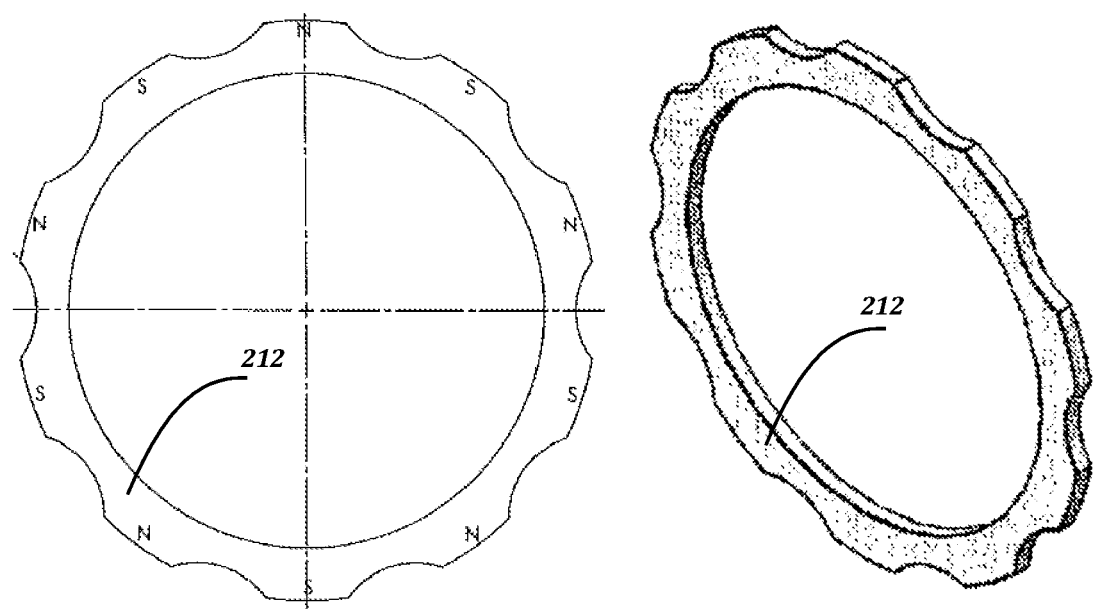

In one or more embodiments, flux adjusters are provided near the APMs. Flux adjusters are elements disposed on the rotor and that guide (direct) magnetic flux density generated by the stator toward the APMs (202). For example, in one or more embodiments one or more flux adjusters in the form of the magnetic gap parts (206) are adjacent between the APMs and provide a flux barrier between the poles of each magnet. Magnetic gap parts are formed between APMs and may be comprised of resin, air, or other non-magnetic material. In one or more embodiments, one or more flux adjusters in the form of magnetic directors (203) may be used to direct magnetic flux from the stator teeth (201) to the APMs (202). A magnetic director (203) may be a part used to direct magnetic flux from the stator teeth (201) to the APMs (202) due to the material characteristics of the magnetic director (203) (e.g. ferrous) or the shape of the magnetic director (203) (e.g., wedge), or both. In one or more embodiments, flux adjusters may be one or more portions of the rotor core that is shaped (e.g. narrowed, concave, or angled) to preferentially direct magnetic flux toward one or more of the APMs. FIG. 2D shows an example of a flux adjuster (212), in accordance with one or more embodiments, that includes narrowed concave portions around which magnetic poles would exist. The flux adjuster can be disposed around the rotor core (204).

In one or more embodiments, a combination of flux adjusters may be used. For example, magnetic gap parts (206) and magnetic directors (203) may be used in combination. In some embodiments, neither may be used. In one or more embodiments, the length of APM is more than 50% of the circumferential length of the d-axis magnetic pole between the APMs. In other words, the length of the d-axis magnetic pole gap along the circumference of the rotor is less than twice the length of the APM along the circumference of the rotor. In one or more embodiments, the APM has a coercivity providing for complete magnetization by a magnetic field equal to or less than an armature reaction that is produced by the power-supplying inverter.

The rotor is mounted on a shaft (210). The rotor may include a sleeve (207) that keeps the APMs (202) and magnetic gap parts (206) or magnetic directors (203) in location relative to each other. The thickness of the sleeve (207) in the radial direction may be determined by considering the centrifugal force exerted by the APMs (202) and magnetic gap parts (206) or magnetic directors (203). Alternatively, in one or more embodiments, the sleeve (207) may adhere to any one of the APMs (202), magnetic directors (203), magnetic gap parts (206) and/or the rotor core (204). In some embodiments, the sleeve (207) may be from a non-binding material, that does not adhere to the APMs (202), magnetic directors (203) or magnetic gap parts (206), and/or rotor core (204). For example, the non-binding sleeve (207) may be from carbon fiber HEX TOW IM10 or a Kevlar tow (i.e., Kevlar twine). Alternatively, the sleeve (207) may be a part of the rotor assembly.

Figure 2E:
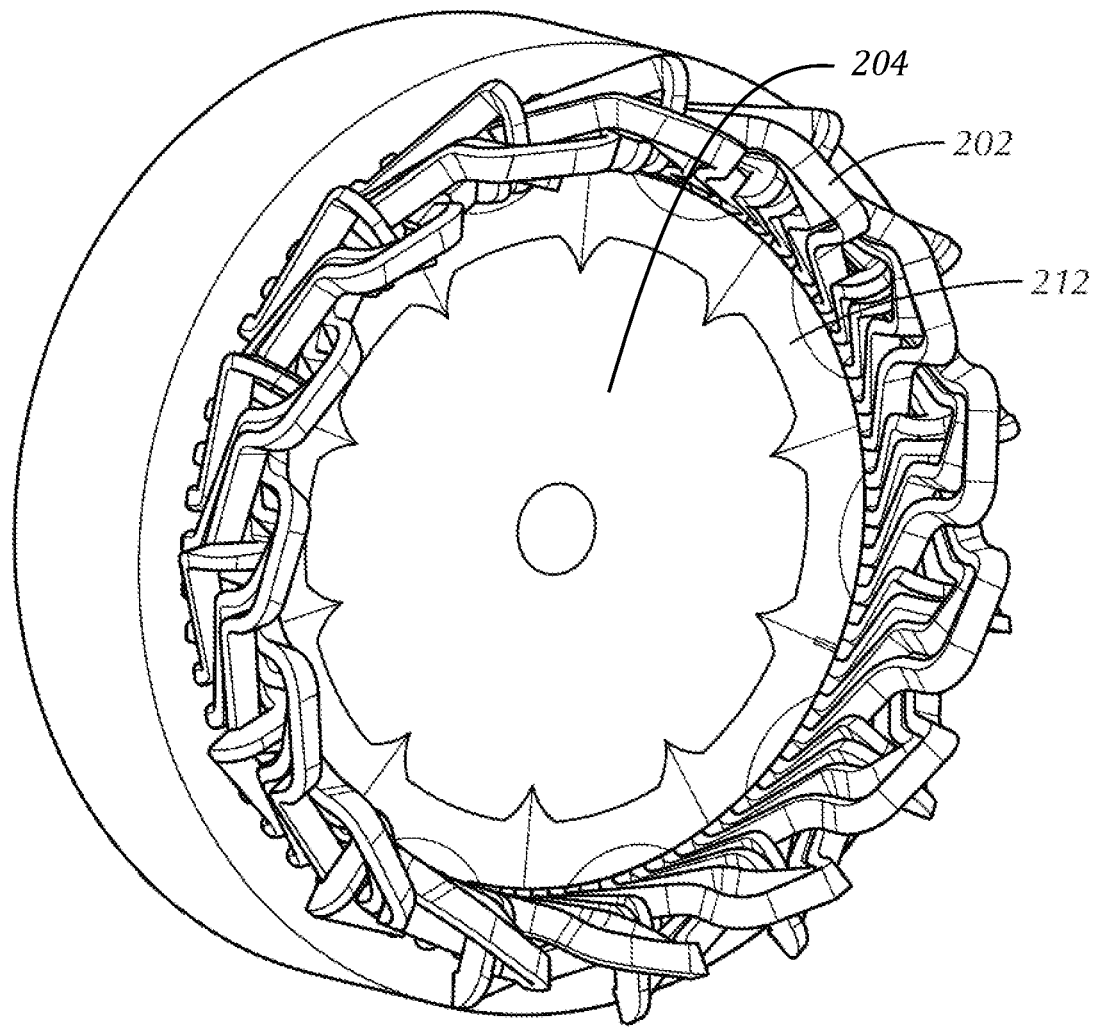

In one or more embodiments, the APMs (202) may be placed in an interlocking configuration that fixes the APMs (202) in their relative position on the rotor core (204). According to one or more embodiments, the rotor includes multiple poles. Each of the poles may include one or more of the APMs (202). In one or more embodiments, the APMs (202) may be split magnets. FIG. 2E shows an example of the interlocking configuration for the APMs (202). As shown in FIG. 2E, the interlocking APMs (202) may be disposed on a flux adjuster (212) that may be similar to the flux adjuster (212) shown in FIG. 2D. Because the interlocking APMs (202) can maintain their positions by locking into each other, it may not be required to dispose the sleeve (207) around the interlocking APMs (202).

Figure 3:
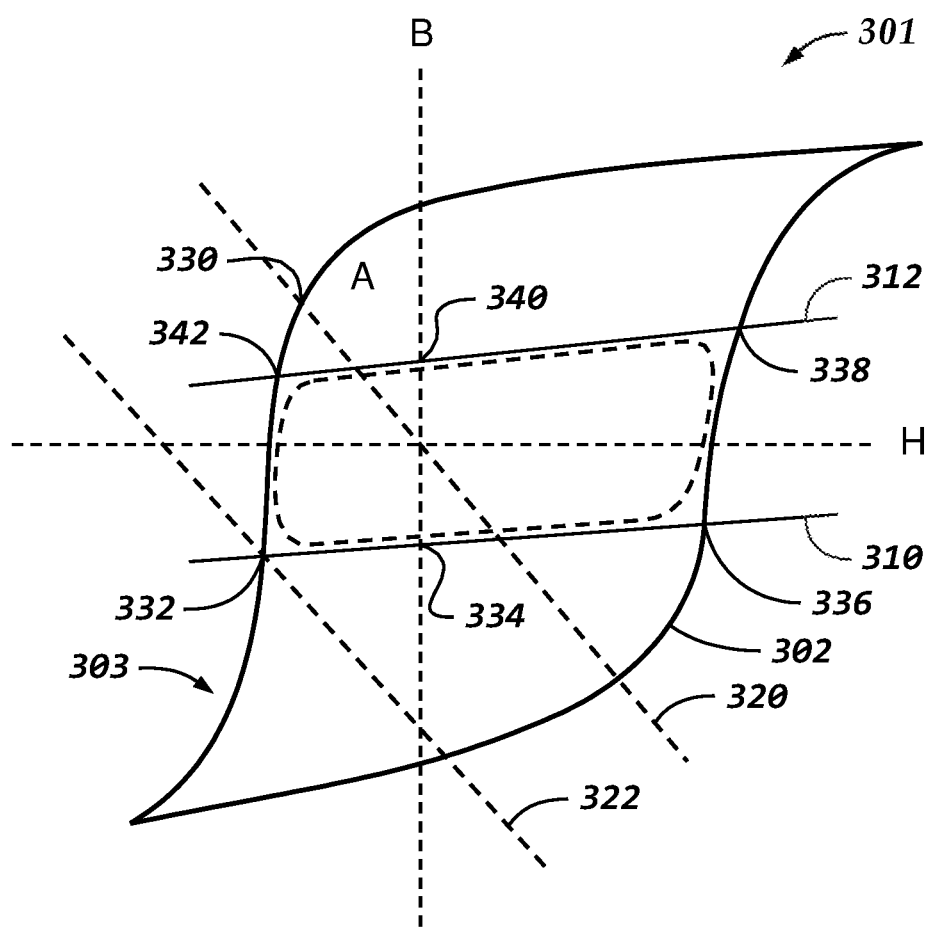
FIG. 3 shows an exemplar non-linear hysteresis curve for an adjustable permanent magnet (APM).

APMs used in embodiments described herein may possess non-linear magnetic hysteresis curves. FIG. 3 shows a magnetic hysteresis loop (301) for an exemplar APM displaying a non-linear relationship between flux density (B) and coercive force/field intensity (H) in accordance with one or more embodiments. The hysteresis loop of an APM will depend on its material properties, but as a category displays a narrow to very narrow hysteresis loop. The magnetic state (MS) of the working point of the exemplar APM can be adjusted dynamically by applying d-axis current ($i_d$) pulses with different polarities and amplitudes. In FIG. 3, increase in coercive force with flux density occurs along the magnetization curve (302), and decrease in coercive force with flux density occurs along the demagnetization curve (303). Referring to FIG. 3, example recoil lines (310, 312) and load lines (320, 322) are shown. A no-load working point (A) of the exemplar APM starts at the intersection (330) of the load line (320) and the demagnetization curve (303). When the armature demagnetization magnetic motive force (MMF) generated by $i_d$ is applied, the working point (A) will move along the demagnetization curve (303). When the MMF is removed, the working point (A) will move from the intersection (332) of the demagnetization curve (303) along recoil line (310) to a point (334) of zero flux density. When the armature magnetization MMF generated by $i_d$ is applied, the working point (A) moves along recoil line (310) until the intersection (336) between the recoil line (310) and the magnetization curve (302), and then the working point (A) will move along the magnetization curve (302) until pulse $i_d$ is removed. At that point (338), the working point (A) will move along recoil line (312) to a point (340) of zero flux density. When the armature demagnetization MMF generated by $i_d$ is applied, the working point (A) will move along recoil line (312) until its intersection (342) with the demagnetization curve (303). Continued application of the demagnetization MMF will move the working point (A) along demagnetization curve (303) until the demagnetization MMF stops, at which point (332), the working point (A) moves along an example recoil line toward a point of zero flux density until a magnetizing MMF is applied. This behavior of the APMs enables possibility of flexible movement of the working point (A) along different recoil lines (310, 312) when applying an external magnetizing or demagnetizing MMF.

The relationship between the MS and the magnetizing current is complicated due to the significant nonlinearity in the magnetic hysteresis for APMs useful in embodiments of FMPMSMs described herein. Various numerical hysteresis models may be used to characterize the repetitive hysteresis behavior of low coercive force magnets such as piecewise linear model, Presaich model, and Frolich models. Although these models may be coupled with finite element methods to compute the specific working point (A) of each PM, it remains challenging to accurately predict the working points (A) of APMs. Other examples of methods to determine this relationship are described in "*Investigation of magnetization characteristics of variable flux PM based on a Fourier-fitting hysteresis model*", AIP Advances 9, 095059 (2019); https://doi.org/10.1063/1.1522766 and "*Analysis of Magnetic Properties of AlNiCo and Magnetization State Estimation in Variable-Flux PMSMs*", IEE Transactions on Magnetics, Vol. 55, No. 7, July 2019. A combination of methods may be used, such as an iterative process of using a model-based estimate or simulation combined with a look-up table populated with empirical experimentation data for a given machine design. For example a process to estimate the $i_d$ required to achieve a desired MS may involve: measuring the back EMF ("current MS state"); within a look-up table, comparing the current MS state to the desired EMF determined by simulation; using the look-up table to determine the difference $i_d$ required to achieve the desired MS from the current MS state; applying the difference $i_d$; remeasuring the back EMF; and repeating these steps until the measured back EMF and the full back EMF are within an acceptable tolerance.

Examples of materials for APMs useful in embodiments described herein include but are not limited to soft-ferromagnetic materials (which are sometimes referred to as "APMs") such as aluminum nickel cobalt (AlNiCo), some types of ceramics, cast magnets, or sintered construction of these materials. Specifically, AlNiCo, SmCo, FeCrCo or other magnetic materials having a coercivity of less than about 2000 Oe (or about 150 kAmp/m) can be employed. These coercivities may differ according to the magnetic circuit design and the inverter system.

Advantages of using such APMs include lower material cost and ability to control and change overall magnetization of the overall magnets of the FMPMSM in a wide range. According to one or more embodiments, the overall magnetization of the APMs can be changed to any value from 0% magnetization (i.e., the APMs are completely demagnetized) to 100% magnetization (i.e., the APMs are magnetized to their maximum capacity). This change in magnetization may occur in a short time (e.g., about 1 millisecond).

Other types of permanent magnets do not tend to change their magnetization easily. For example, changing the magnetization of hard magnets, such as some grades of neodymium iron boron (NdFeB) and samarium cobalt (SmCo), may require a power more than 10 folds higher than a power required to change the magnetization of an APMs. Changing magnetization of hard magnets requires significantly more power than operating power of most synchronous machines or inverters therein. In addition, such hard magnets are significantly more expensive than APMs.

To magnetize the FMPMSM, an electric current is applied in the d-axis to the APMs. The electric current may then be removed to maintain the torque of the FMPMSM high. In routine operation, pulses of electric current are generated using a power source connected to an inverter and are fed to the FMPMSM. The specification and use of power sources and inverters to supply alternating currents are routine and well known to persons working with conventional or unconventional PM machines. An inverter useful in a FMPMSM can provide maximum excitation current under expected operating conditions such as temperature, voltage, and desired longevity.

In one or more embodiments of the invention, durations of the pulses of electric current are reduced to increase efficiency of the FMPMSM (i.e., decreasing the power consumed by the FMPMSM to achieve a predetermined level of magnetization of the APMs). These findings are explained below with reference to FIGS. 4A-4C and 5.

Figure 4A:
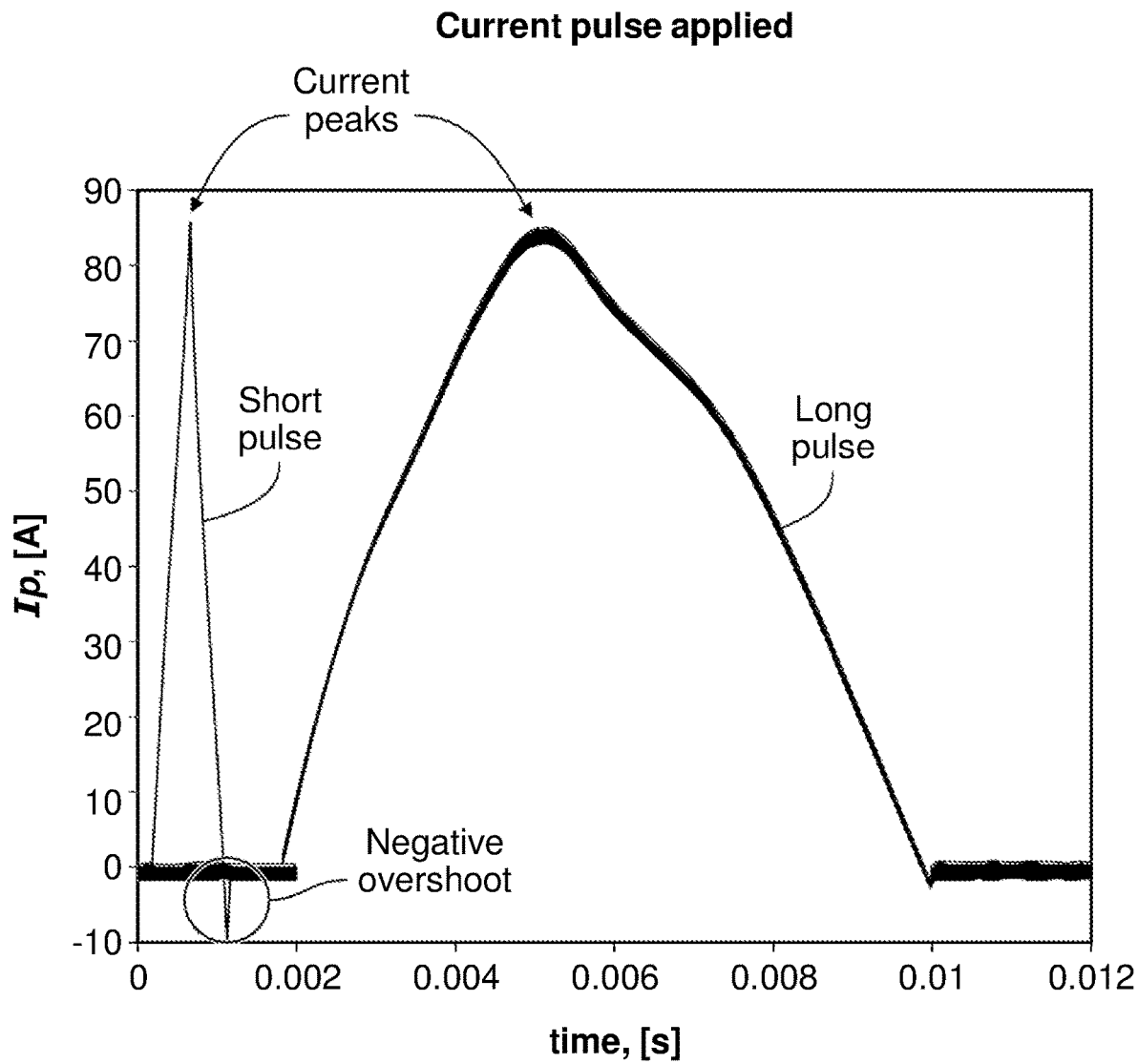
FIG. 4A shows pulses of electric current to magnetize an APM in accordance one or more embodiments of the invention.

FIG. 4A shows a triangular-shape long pulse with a duration of about 12 millisecond (ms), which is a typical long pulse duration for magnetizing low-power unconventional PM machines (i.e., less than 30 kilowatt (kW)), and a triangular-shape short pulse with a duration of about 1.5 ms. The 1.5 ms pulse is significantly shorter than typical pulse durations for high-power unconventional PM machines (i.e., more than 100 kW), which are more than 2 ms. In one or more embodiments, a duration of a pulse may be a time period in which an amplitude of the pulse of electric current is equal to or higher than 10% of the peak amplitude of the pulse. The short pulse in FIG. 4A has a negative overshoot that can be filtered.

Figure 4B:
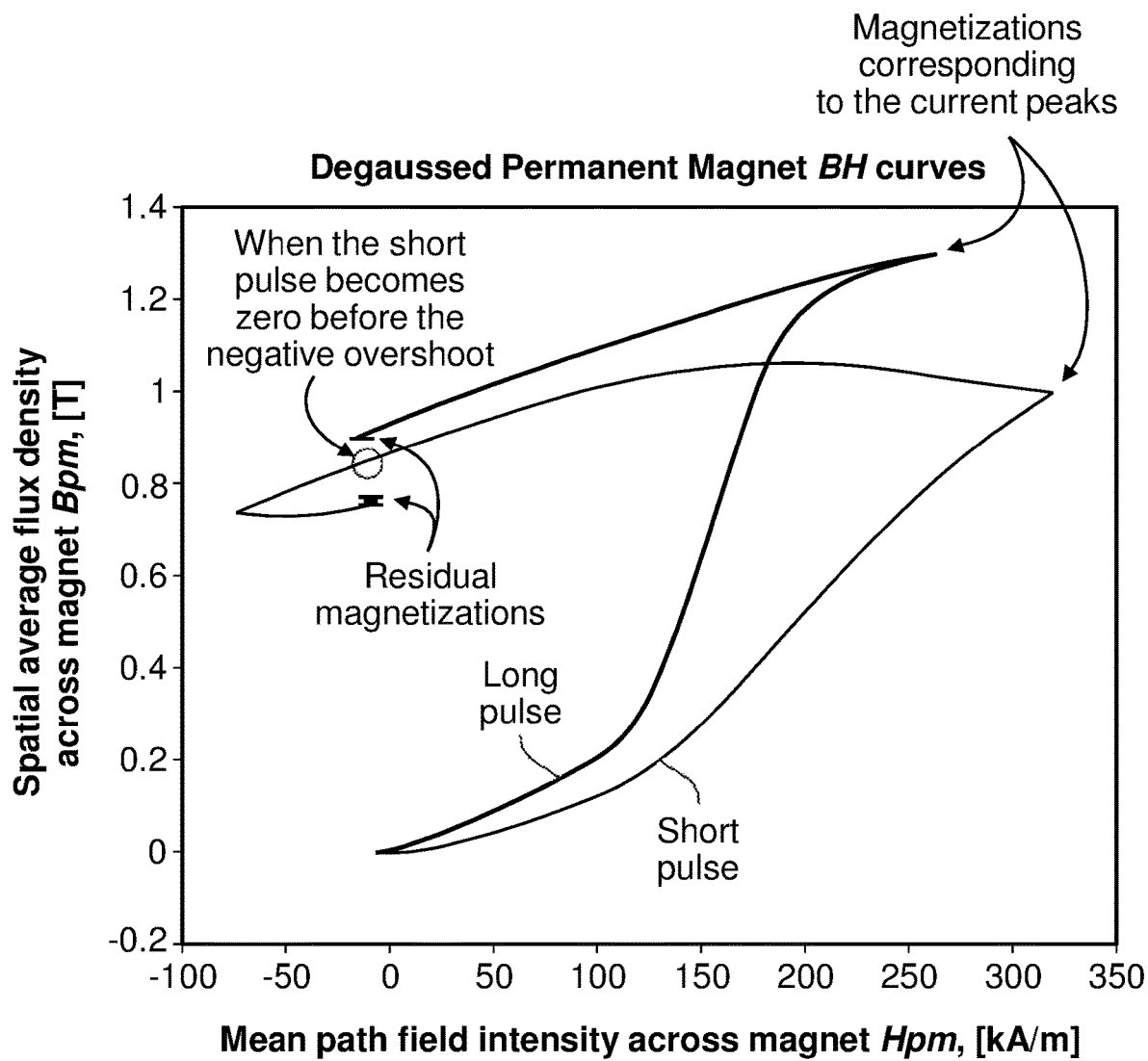
FIG. 4B shows magnetization curves of the APM in response to the pulses of electric current shown in FIG. 4A.

As an example, FIG. 4B shows magnetization curves of an AlNiCo-9 APM in response to the pulses shown in FIG. 4A. When the electric currents increase from zero to the peak amplitude of the pulses, the average magnetic flux in the APM increases. At the peak amplitude, the average magnetic flux of the APM corresponding to the long pulse (having the duration of 12 ms) is higher than the average magnetic flux of the APM corresponding to the short pulse (having the duration of 1.5 ms) by 0.3 Tesla (T). However, when the pulses decay from the peak amplitude to zero, the average magnetic flux of the APM corresponding to the long pulse decreases more than the average magnetic flux corresponding to the short pulse. In other words, the average magnetic flux that corresponds to the short pulse does not decay as much as the average magnetic flux that corresponds to the long pulse. As shown in FIG. 4B, when the pulses decay to zero before becoming negative in an overshoot, the average magnetic flux of the APM corresponding to the long pulse is only about 0.05 T higher than the average magnetic flux corresponding to the short pulse.

As shown in FIG. 4B, at the negative overshoot, the short pulse becomes negative and then stabilizes at zero (i.e., stable zero current). Even after the negative overshoot, the average magnetic flux of the APM corresponding to the long pulse is only about 0.15 T higher than the average magnetic flux of the APM corresponding to the shorter pulse. In other words, when the two pulses decay to zero from the same peak amplitude, the demagnetization of the APM would be less in response to the short pulse than in response to the long pulse. Hereinafter, the average magnetic flux linkage at the current that is stably zero after the pulse is referred to as "residual magnetization." FIGS. 4B and 4C show the residual magnetizations of the APM corresponding to the long and short pulses shown in FIG. 4A.

Figure 4C:
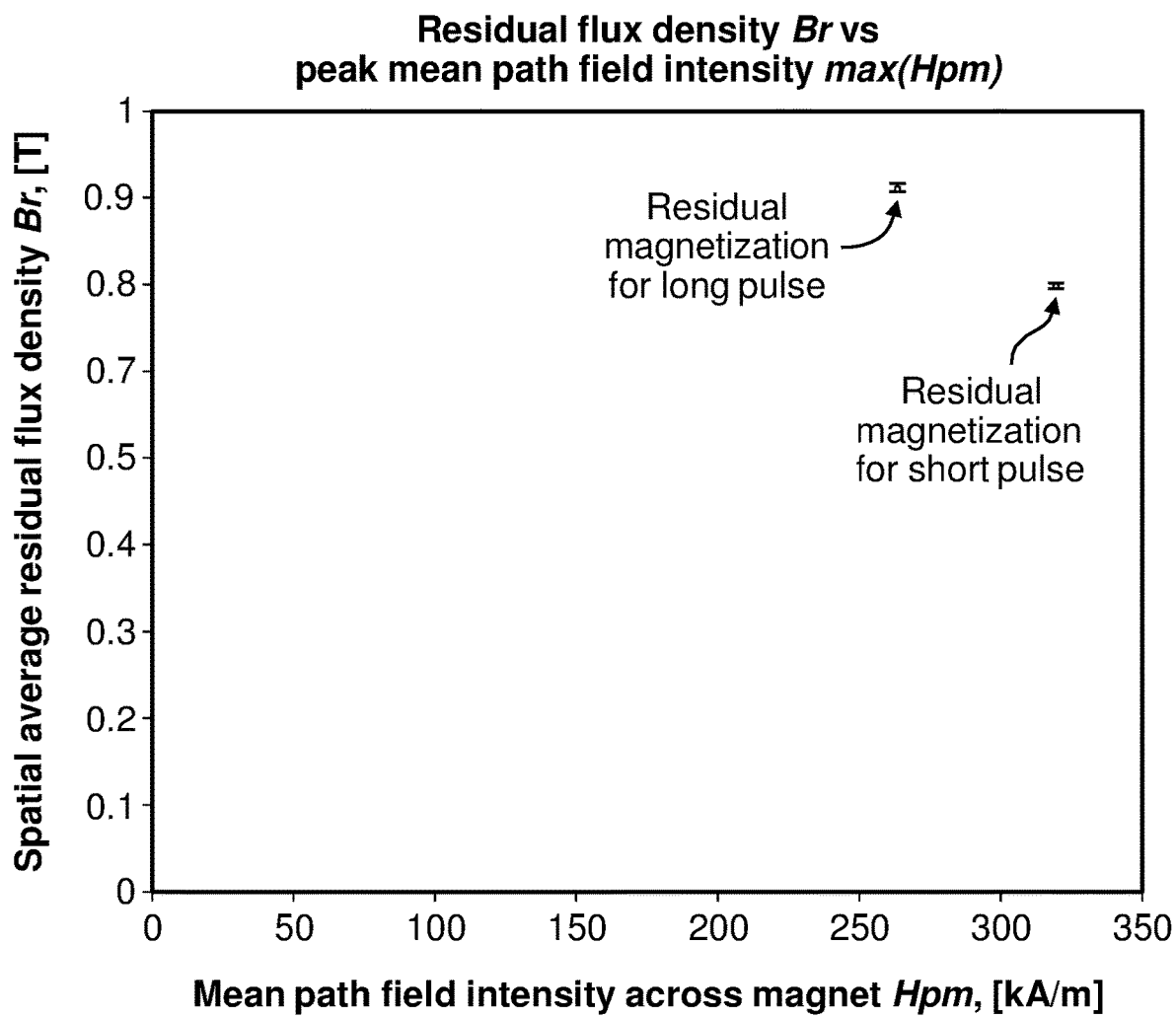
FIG. 4C shows residual magnetizations corresponding to the magnetization curves shown in FIG. 4B.

According to FIGS. 4B and 4C, the residual magnetization of the APM in response to the short pulse is only about 16% lower than in response to the long pulse, while the electric power consumed by the short pulse is about 5% of the electric power consumed by the long pulse. Thus, high magnetization of the APM can be achieved with significantly less electrical power. In machine operation, it may be desirable to achieve high magnetization of the APM in a time frame when mechanical effects for the torque point from the motor shifting are greatly reduced.

Although FIGS. 4B and 4C display the results for an AlNiCo-9 APM, one of ordinary skill in the art understands that the invention is not limited to only AlNiCo-9, and the embodiments of the invention may expand to other types of APMs, including other grades of AlNiCo.

In one or more embodiments of the inventions, the duration of the pulse of electric current may be equal to or more than 0.1 ms. In one or more embodiments of the invention, the duration of the pulse of electric current may be equal to or more than 0.3 ms and equal to or less than 2 ms. Hereinafter, the short pulse may be referred to as a primitive pulse. More specifically, the duration of the primitive pulse may be equal to or more than 1 ms. In one or more embodiments, the duration of the primitive pulse may be equal to or more than 1.5 ms and only one pulse magnetizes the APM, as shown in FIGS. 4A-4C.

Figure 5:
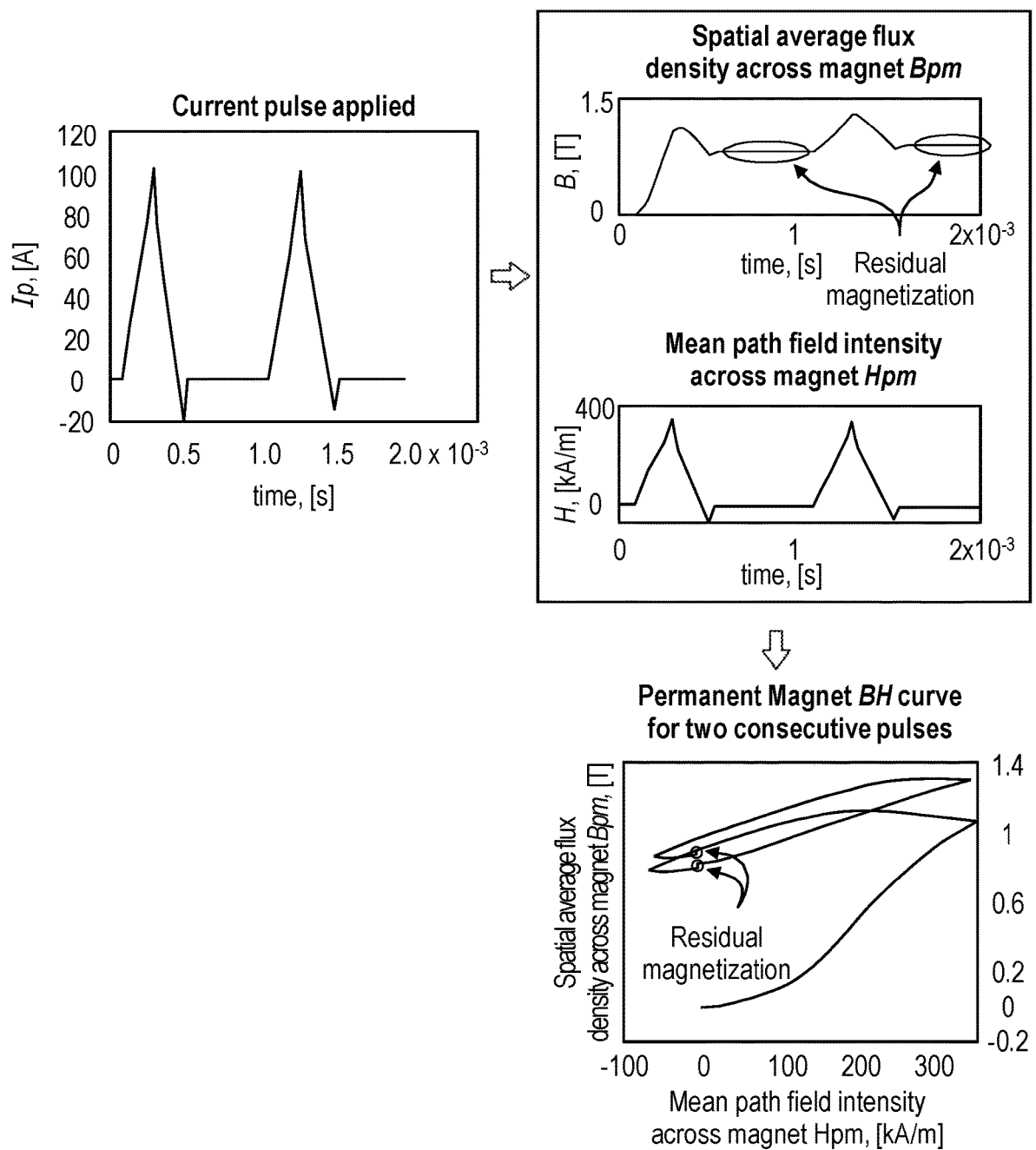
FIG. 5 shows magnetization of an APM in response to pulses of electric current in accordance with one or more embodiments of the invention.

In one or more embodiments of the invention, multiple consecutive pulses that each has a duration of equal or less than the primitive pulse (e.g. 1.5 ms) may magnetize the APM. By using the multiple consecutive primitive pulses, the residual magnetization of the APM may be increased while keeping the power consumption low. FIG. 5, which is an example of these embodiments, shows that two consecutive primitive pulses that each has a duration of about 0.5 ms is used to magnetize the APM. After the first primitive pulse, the residual magnetization of the APM remains at about 0.8 T. Then the second primitive pulse increases this residual magnetization to a higher residual magnetization of about 0.9 T. The amount of power consumed by the combination of pulses in FIG. 5 is about 8% of the power consumed by the long pulse shown in FIG. 4A, while the residual magnetization in response to the combination of primitive pulses shown in FIG. 5 and the residual magnetization in response to the long pulse shown in FIG. 4A are almost the same.

In one or more embodiments of the invention, more than two consecutive pulses may be used to magnetize the APM. For example, 10 consecutive primitive pulses each having a duration of 0.5 ms may be used in a time period of 10 ms. Even with the 10 consecutive primitive pulses, the total power consumed by the primitive pulses would be about 30% of the 12 ms long pulse shown in FIG. 4A. Thus, with using primitive pulses, high magnetization of APMs in a FMPMSM can be achieved while the power consumed to magnetize the APMs can be significantly reduced.

Figure 6:
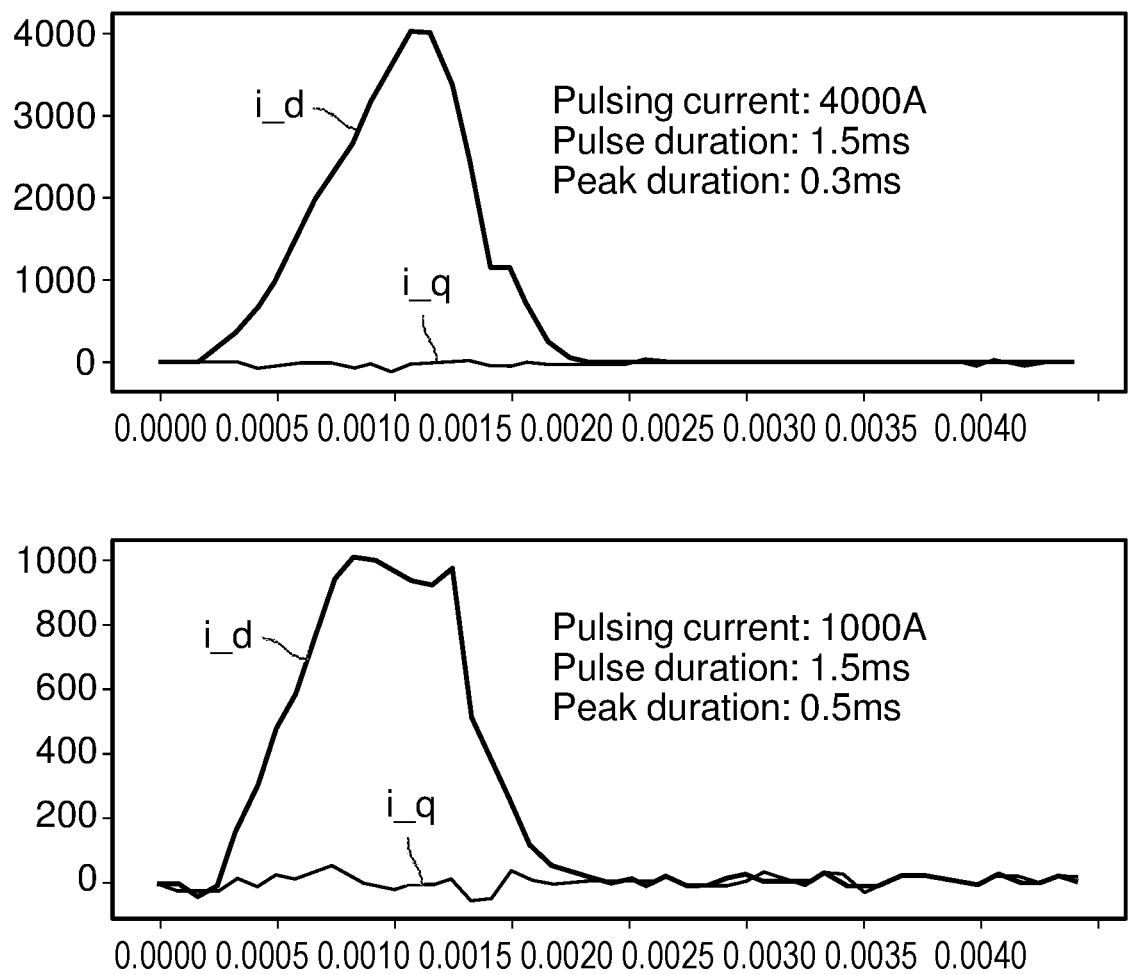
FIG. 6 shows current pulses for magnetization of an APM in accordance with one or more embodiments of the invention.

The duration and shape of the current pulses may depend on practical limitations of the power supply that provides the required amount of energy for magnetizing the APM. For example, assuming that the APM is completely demagnetized (a current MS of the APM is 0%), magnetizing the APM to 20% MS and 100% MS may require 1000 A and 4000 A direct-axis current ($I_d$), respectively. If these two currents are given in pulses with the same duration to the APM, the shape of the current pulses generated by the power supply may be different depending on the capability of the power supply, as shown in FIG. 6.

The capability of the power supply to provide primitive current pulses depends on the inductance of the circuit (e.g., the windings used for magnetizing the APM) for which the primitive current pulses are provided. For example, for larger windings having a higher inductance, the time constant of the current pulse would be higher. In other words, for a larger winding inductance, it takes longer for the current pulse to reach a target current peak.

To keep the FMPMSM operation stable, the working point may be adjusted to a certain level of magnetic saturation. In some operating conditions (e.g. high speed), the desired magnetization of the APMs may be adjusted to less than 20% or 40% magnetic saturation during machine operation. In other operating condition (e.g., higher torque at lower speed), the magnetization of the APMs may be adjusted to greater than 70% magnetic saturation during machine operation.

Figure 7A:
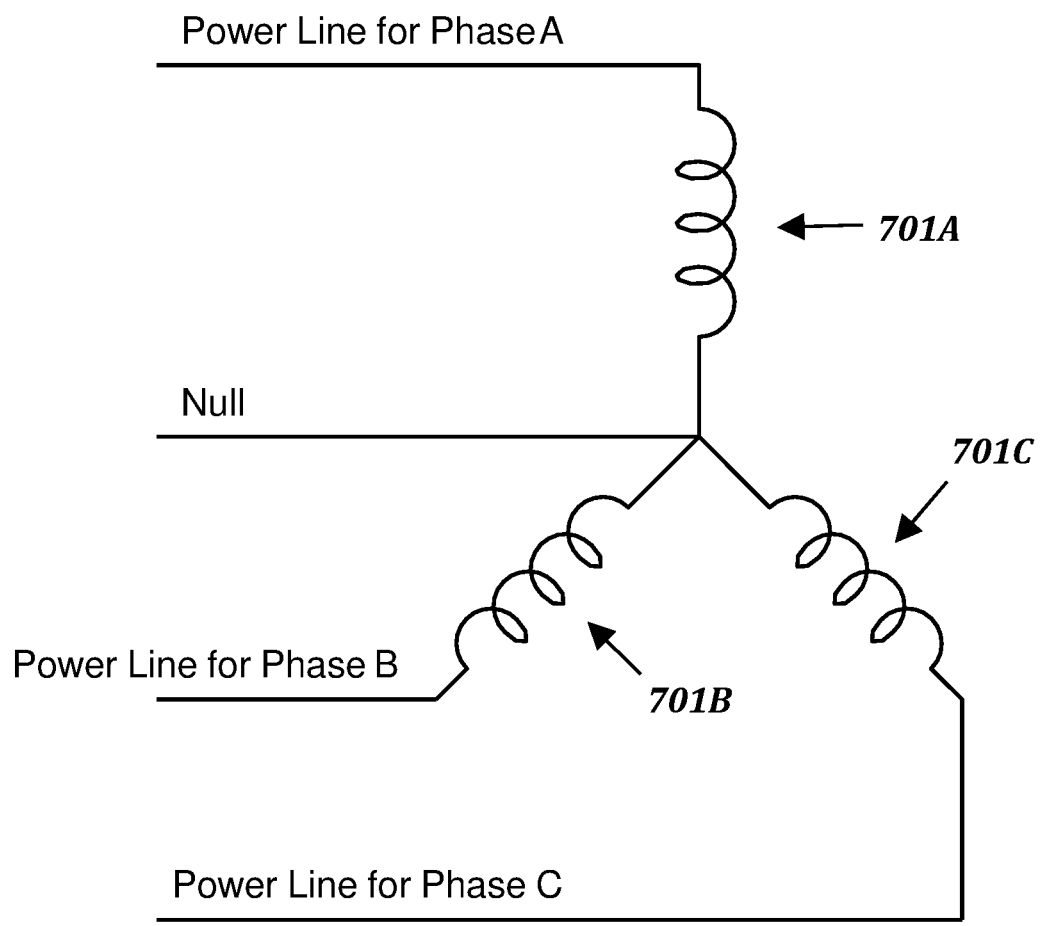
FIG. 7A shows a simplified circuit model of stator windings of a variable flux memory motor (VFMM) in accordance with one or more embodiments of the invention.

According to one or more embodiments, the stator windings create the magnetic flux linkage necessary to magnetize the FMPMSM and rotate the rotor. FIG. 7A shows a simplified circuit model of the stator windings that are wound in a wye configuration. There are three stator windings (i.e., first stator winding (701A), second stator winding (701B), and third stator winding (701C)) that carry phases A, B, and C, which are delayed from each other by 120 degrees. For example, if phase A is zero, phase B is 120 degrees and phase C is −120 degrees. The three stator windings are connected to a null. Each of the three stator windings may include multiple winding coils that are wound in the same direction and are connected with each other.

Figure 7B:
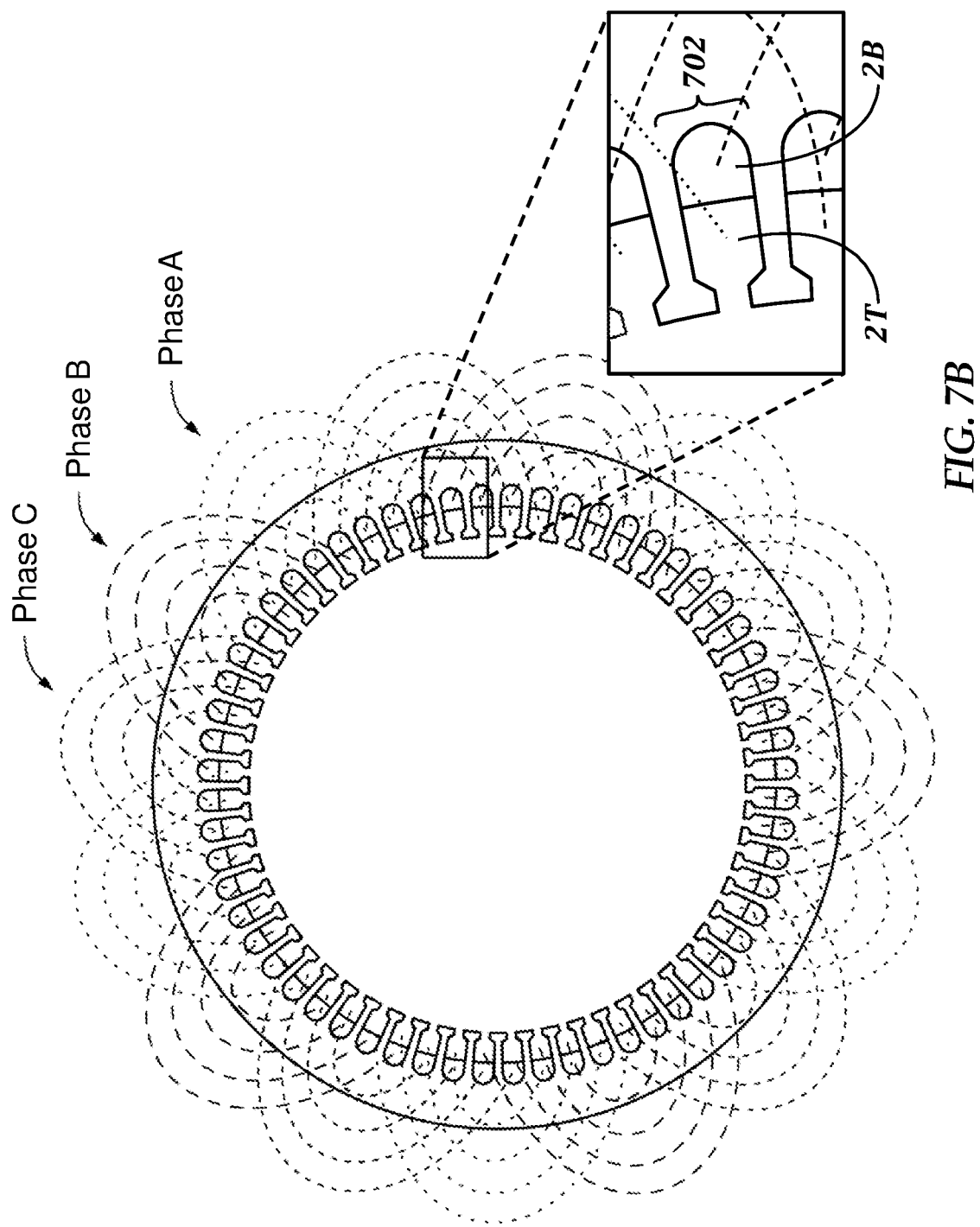
FIG. 7B shows stator windings of the VFMM in accordance with one or more embodiments of the invention.

FIG. 7B shows how the three stator windings are wound in the stator by way of an example in accordance with one or more embodiments. Each of the stator windings includes a plurality of winding coils. In the example shown in FIG. 7B, each of the stator windings for phases A, B, and C includes 20 winding coils. For each of the three phases, the winding coils carry a single phase (i.e., one of phases A, B, and C).

In the example shown in FIG. 7B, each of the stator slots (702) accommodates one end of one winding coil and one end of another winding coil. For example, stator slot 2 shown in the magnified view of FIG. 7B includes a top section (2T) that accommodates an end of a winding coil for phase A and a bottom section (2B) that accommodates an end of a winding coil for phase B.

Figure 7C:
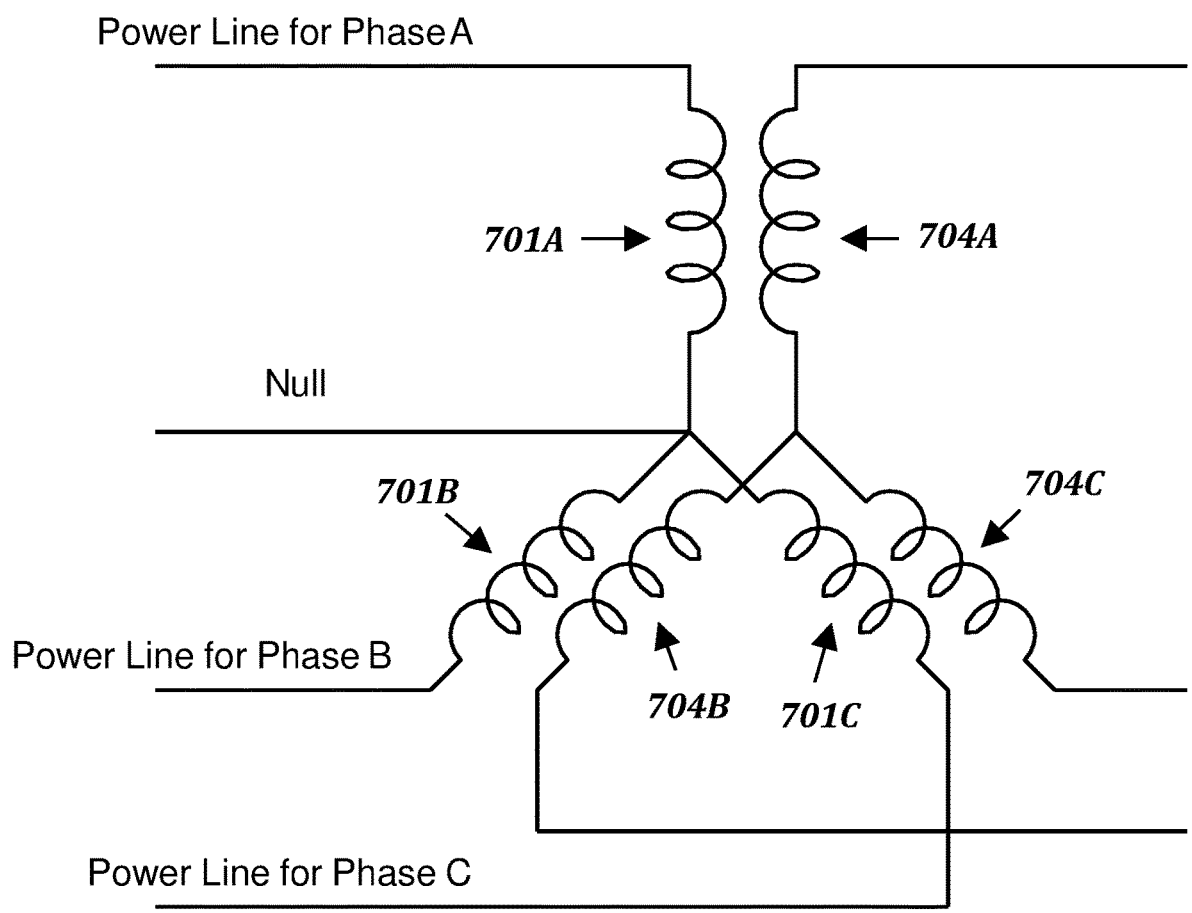
FIG. 7C shows a simplified circuit model of stator windings and sense coils of the VFMM in accordance with one or more embodiments of the invention.

According to one or more embodiments, each of phases A, B, and C may have a sense coil (in addition to the winding coils) to measure the MS of the APMs. Thus, there may be three sense coils (i.e., first, second, and third sense coils). The sense coils can be disposed on or embedded in the stator windings, but the sense coils are electrically insulated from the stator windings. FIG. 7C shows a simplified circuit model of the first, second, and third stator windings (701A, 701B, 701C, respectively) with first, second, and third sense coils (704A, 704B, 704C, respectively) corresponding to phases A, B, and C, respectively, that are wound in the wye configuration. One of ordinary skill in the art would have appreciated that the stator windings and sense coils may be wound in a D (delta) configuration to achieve specific functions.

In one or more embodiments, because a high current pulse may be required for magnetizing or demagnetizing the APMs, the stator windings may be wound in the wye configuration because in the wye configuration, the current pulse in a power line of the FMPMSM for each phase is equal to the current in the stator winding for that phase. Thus, the current in the stator windings may be directly controlled and simply measured by controlling and measuring the current in the power lines. However, in the D configuration, the currents of the stator windings are not necessarily equal to the currents of the power lines.

In one or more embodiments, the stator windings used for FMPMSM operation may be used to convey a current pulse for magnetization. In one or more embodiments, a separate winding to convey the current pulse for magnetization may be provided separate from the stator windings used for FMPMSM operation. Use of a separate winding to convey the current pulse for magnetization provides flexibility in designing the winding (i.e., wire gauge, number of turns) to convey a current pulse designed specifically for the required magnetization current of the FMPMSM. When a separate winding is used, it may be placed in the same slot or an additional slot in the stator.

In one or more embodiments, the sense coils inductively generate a sense-coil back electromotive force (back-emf) using the magnetic flux of the APMs. The strength (amplitude) of the sense-coil back-EMF indicates the MS of the APMs and the rotor position. The sense coil has parameters that have fixed values such as inductances and resistances and parameters with variable values such as angular velocity, angular position, and current. In one or more embodiments, to measure the MS of the APMs, these fixed and variable-value parameters must be known.

Figure 8:
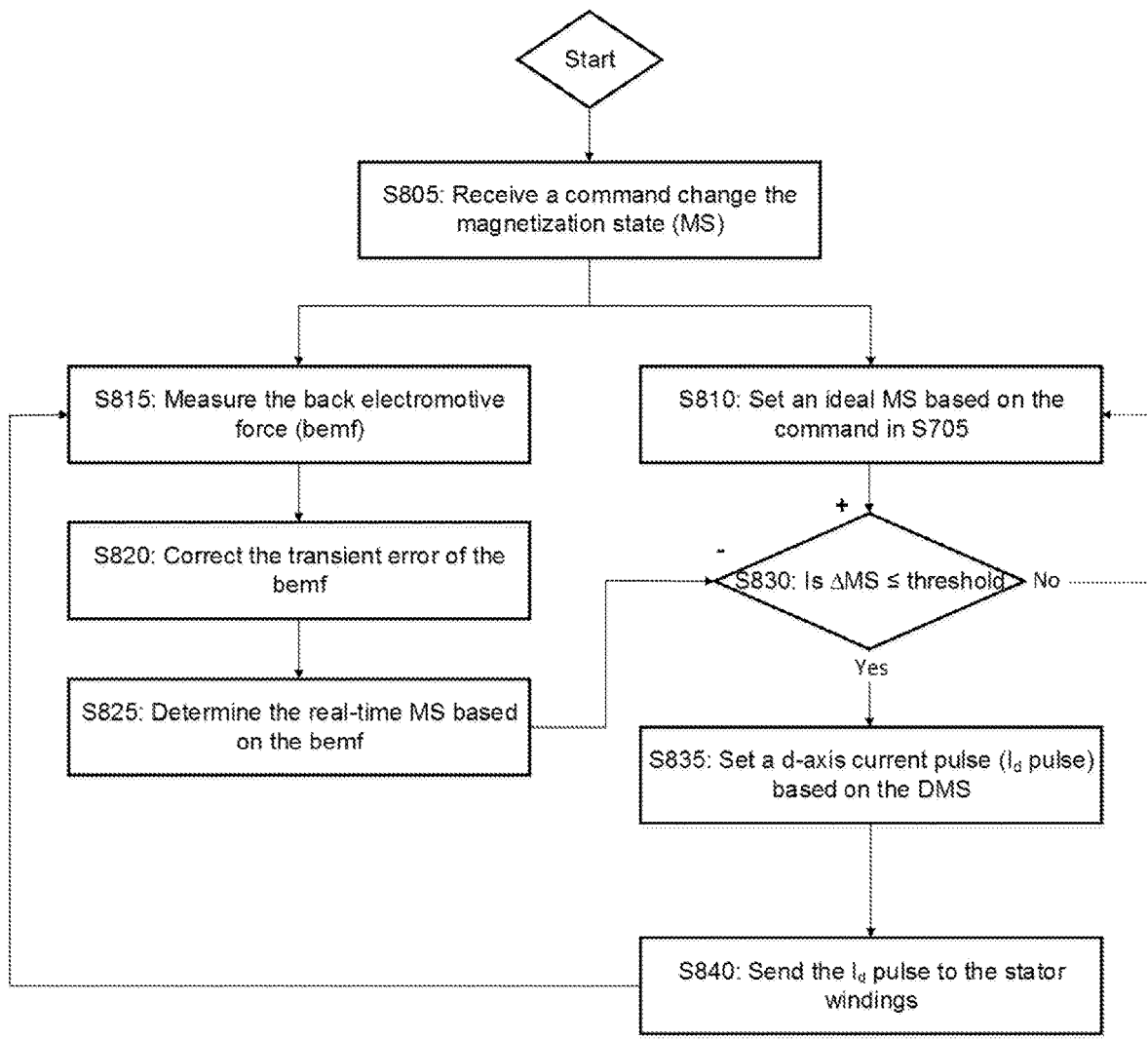
FIG. 8 shows a flowchart depicting a method for magnetization of a VFMM in accordance with one or more embodiments of the invention.

FIG. 8 shows a flowchart that depicts a real-time operating method of manual controlling the MS of the APMs and accordingly manually controlling the torque of the FMPMSM using the controller. Hereinafter, the manual control of the MS is a controlling procedure in which an initial command for changing the torque and accordingly the MS is initiated by a human. As a non-limiting example, in a case that the FMPMSM is a motor of an electric vehicle, the command may be a gear shift or a command to increase the speed of the electric vehicle from a driver input on a command device (e.g., throttle pedal). Alternatively, in a case that the FMPMSM is the motor of industrial machinery, the command may be made via an input on the control panel of the operator.

In step 805 (S805), the controller receives the command to change the MS. For example, the command may be an increase or decrease of the motor torque/RPM that requires changing the MS.

In S810, the controller determines and sets an ideal MS based on the command received in S805. For example, in a case the command is the gear shift, the ideal MS is determined based on a preliminary analysis (e.g., a table) that correlates the most optimal MS as the ideal MS to the chosen gear. For example, gear 1 may be associated with MS of 100%, while gear 2 may be associated to MS of 80%.

According to one or more embodiments, MS of 100% may be the MS of the APMs in which the APMs are magnetized to their full capacity or to a magnetization of the APMs that is defined (or limited to) as the maximum magnetization based on a specific design or function of the FMPMSM. On the other hand, MS of 0% is the MS of the APMs in which the APMs are completely demagnetized.

In another example in accordance with one or more embodiments, when the command to achieve a desired RPM/torque is received, the controller may find the ideal MS from a table that associates the desired RPM/torque to the ideal MS. Table 1 below shows an exemplary table that associates the desired RPM/torque to the ideal MS.

TABLE 1

| RPM | Torque (N.m.) | Ideal MS (%) |
|---|---|---|
| 1000 | 100 | 100 |
| 2000 | 200 | 100 |
| 4000 | 400 | 100 |
| 6000 | 250 | 75 (±5%) |
| 6000 | 150 | 75 (±5%) |
| 12000 | 100 | 50 (±5%) |
| 18000 | 50 | 22 (±5%) |

In S815, the controller measures and estimates the back-emf of the FMPMSM. According to one or more embodiments, the back-emf is the voltages induced in the sense coils by the rotor. The back-emf is proportional to $l_m$ by a turns constant integer. Thus, the back-emf indicates the real-time MS (i.e., the actual MS of the APMs at the time of the measurement).

In S820, the controller may correct the value of the back-emf measured in S815 from transient errors. For example, due to a transient operation of the FMPMSM or the power converter, the measured back-emf may include transient errors/noises (e.g., sparks, oscillations, etc.) that do not project the real-time MS. The controller may remove the transient errors/noises from the back-emf to obtain a more realistic value of the real-time MS.

In S825, the controller determines the real-time MS based on the back-emf. For example, the controller may determine the real-time MS based on a table that associates various back-emf values to values of the real-time MS. In one or more embodiments, the controller determines the real-time MS based on the corrected back-emf from S820. Alternatively, the controller may use the uncorrected value of the back-emf to determine the real-time MS.

In one or more embodiment, the controller may determine the real-time MS from the uncorrected or corrected back-emf, and then, the controller may apply some corrections (e.g., filtering noise) on the value real-time MS to obtain the final value of the real-time MS.

According to one or more embodiments, after the command from S805, the real-time MS and the ideal MS may be determined simultaneously. To do this, S815 through S825 may be performed simultaneously with S810.

In S830, the controller subtracts the ideal MS obtained from S810 from the real-time MS obtained from S825 to obtain a magnetization difference (DMS). If the absolute value of DMS≤a threshold (e.g., 5% of the ideal MS), the real-time MS is sufficiently close to the ideal MS and there is no need to change the real-time MS. Otherwise, the controller continues to S835 described below.

In S835, the controller determines and sets an $I_d$ pulse based on the DMS obtained from S830. For example, the controller may determine the $I_d$ pulse based on a table that associates various values of the DMS to values of the $I_d$ pulse. In another example, the $I_d$ pulse may look similar to the pulses of electric current discussed above with reference to FIGS. 4A-4C and 5.

In S840, the controller commands sending the $I_d$ pulse determined from S835 to the stator windings of the FMPMSM. For example, this command may be sent to the power convertor to generate and send the $I_d$ pulse to the stator windings.

According to one or more embodiments, the duration, shape, or number of the $I_d$ pulse may be determined based on the torque/RPM of the FMPMSM. According to one or more embodiments, the duration of the $I_d$ pulse may be about 1 millisecond (ms).

In one or more embodiments, after S840, the controller may go back to S815 and redo S5815 and the steps after S815 to determine whether the DMS is within the threshold or not. If DMS is not within the threshold, the controller applies another $I_d$ pulse to adjust the real-time MS. This process may continue until the real-time MS is adjusted such that the DMS falls within the threshold.

Figure 9:
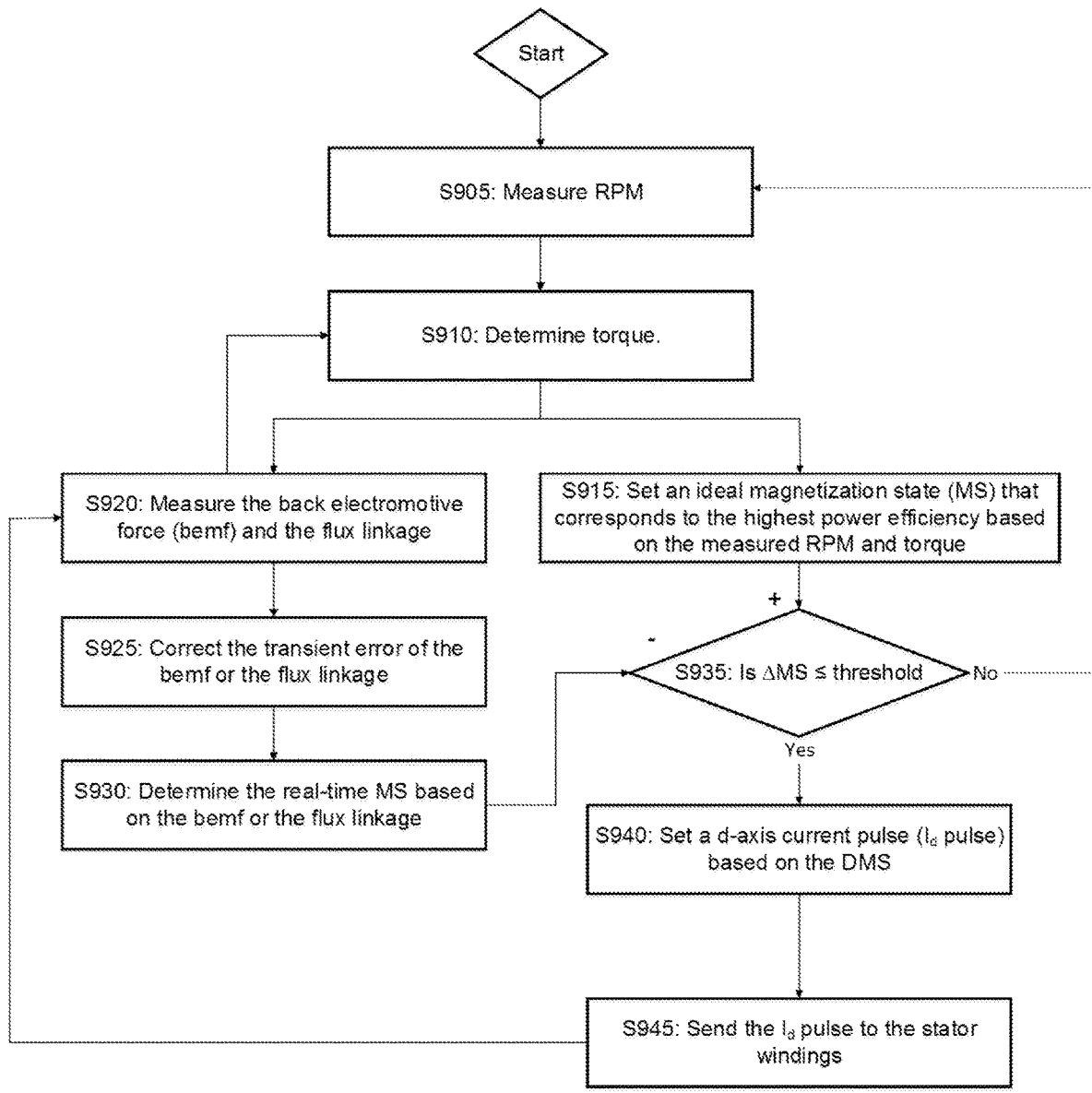
FIG. 9 shows a flowchart depicting a method for magnetization of a VFMM in accordance with one or more embodiments of the invention.

FIG. 9 shows a flowchart that depicts a method of automatic controlling of the MS of the APMs using the controller. Hereinafter, the automatic control of the MS is a controlling process that automatically adjusts the MS based on the RPM and torque of the FMPMSM to maintain the highest power efficiency of the FMPMSM.

In S905, the controller measures the RPM of the FMPMSM.

In S910, the controller determines the torque of the FMPMSM. According to one or more embodiments, the controller may determine the torque based on the back-emf measured in S920 and/or S925, described below.

In S915, the controller determines and sets an ideal MS that corresponds to a criterion that is set for the FMPMSM. For example, the criterion may be the highest efficiency (e.g., power efficiency) based on the RPM and torque determined in S905 and S910, respectively; high performance; energy saving; etc. For example, the controller has access to a table that associates values of RPM and torque with values of the ideal MS, which results to the set criterion. From this table, the controller determines the ideal MS corresponding to the measured RPM and torque.

Figure 10:
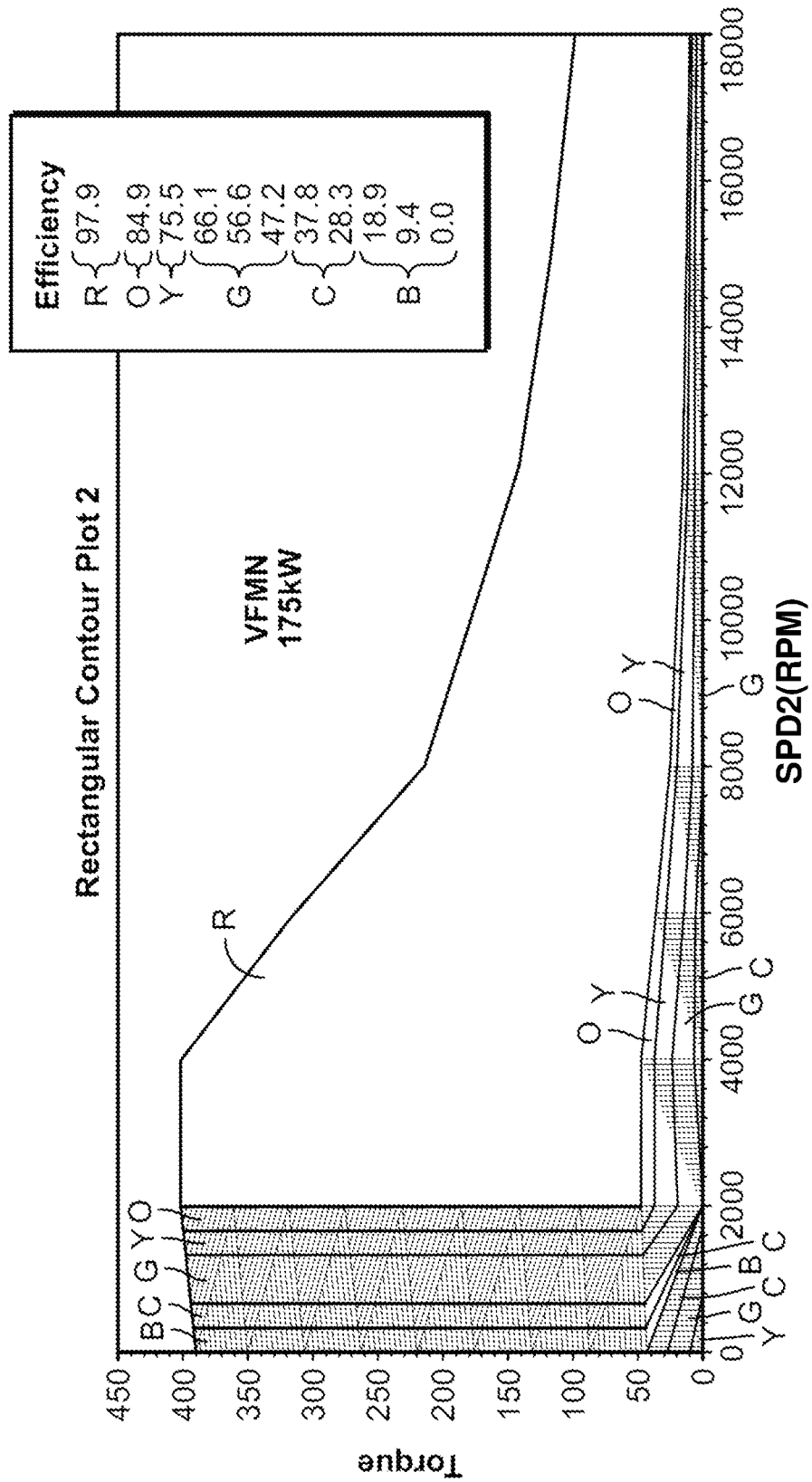
FIG. 10 shows a diagram in accordance with one or more embodiments of the invention.

FIG. 10 shows a thermal graph of the power efficiency of the FMPMSM with respect to the RPM and torque for the example where the set criterion is the power efficiency. In one or more embodiments, each point on the efficiency map of the FMPMSM shows the power efficiency and an ideal MS is associated with that point.

In S920, the controller measures the back-emf of the FMPMSM. This is similar to S815 described above. According to one or more embodiments, the controller may also calculate the $l_m$ of the FMPMSM based on the back-emf. Then, the controller may determine the torque for S910 based on the $l_m$.

For example, the torque may be calculated based on the following equation:

$$\text{Torque} = (3/2) \times (\text{number of poles}/2) \times (\text{lambda}_m \times I_d + (Ld-Lq) \times Id \times Iq)$$

where $\text{lambda}_m$ is the flux linkage based on the back-emf, and Ld and Lq are the direct and quadrature axis inductance, respectively.

In S925, the controller may correct the measured back-emf in S815 from transient errors. This may be similar to S820 described above. According to one or more embodiments, the controller may calculate $l_m$ based on the corrected back-emf. Alternatively, the controller may calculate $l_m$ based on the non-corrected back-emf and then, correct $l_m$ from the transient errors.

In S930, the controller determines the real-time MS based on the corrected back-emf. This may be similar to S825 described above. According to one or more embodiments, the controller may determine the real-time MS based on the $l_m$. For example, the controller may look up the real-time MS on a table that associates various $l_m$ values to values of the real-time MS.

S935 is similar to S830. Further, according to one or more embodiments, if the absolute value of DMS≤a threshold, the real-time MS is ideal and there is no need to change the real-time MS. In this case the controller may go back to S905. Otherwise, the controller continues to S940.

S940 is similar to S835 described above.

S945 is similar to S840 described above.

In one or more embodiments, after S945, the controller may go back to S920 and redo S920 and steps after S920 to determine whether the DMS is within the threshold or not. If DMS is not within the threshold, the controller applies another $I_d$ pulse to adjust the real-time MS. This process may continue to adjust the real-time MS such that DMS falls within the threshold.

In one or more embodiments, the steps in each of the manual and automatic control of the MS described with reference to FIGS. 8-9 may be performed in a different order than what is described above, unless it is stated otherwise. The steps may be omitted or may be performed multiple times to achieve a desired control of the MS.

According to one or more embodiments, a flux-mnemonic permanent magnet synchronous machine (FMPMSM) comprises: an annular stator having a winding; a rotor disposed concentric with the stator; and a power inverter for dispensing an excitation current and at least one current pulse. The rotor comprises: at least two circumferentially magnetized adjustable permanent magnets, each permanent magnet having two poles normal to an air gap between the stator and rotor; and one or more flux adjusters adjacent to one or more magnet poles of the permanent magnets. A polarization ratio of magnetization of at least one of the permanent magnets is adjustable during operation of the FMPMSM by application of the at least one current pulse.

According to one or more embodiments, a magnetic flux density in the air gap of the FMPMSM is influenced by adjusting the polarization ratio of the at least one permanent magnet by dispensing the at least one current pulse.

According to one or more embodiments, a magnetic flux density in the air gap of the FMPMSM is controlled during operation of the FMPMSM by adjusting the polarization ratio of the at least one permanent magnet.

According to one or more embodiments, the at least one permanent magnet of the FMPMSM has a coercivity of less than 2000 Oe (150 kAmp/m). According to one or more embodiments, the circumferentially magnetized permanent magnets of the FMPMSM have a coercivity of less than 2000 Oe (150 kAmp/m).

According to one or more embodiments, the circumferential magnetization of the permanent magnets of the FMPMSM is varied by applying the at least one current pulse having a duration of less than 3 ms.

According to one or more embodiments, a duration of the at least one current pulse dispensed by the power invertor is less than 1.5 ms. According to one or more embodiments, a duration of the at least one current pulse is less than 0.5 ms.

According to one or more embodiments, a length of each of the permanent magnets of the FMPMSM is more than 50% of a circumferential length of a d-axis magnetic pole between the at least two permanent magnets.

According to one or more embodiments, the magnetization of the permanent magnets is adjustable to less than 40% magnetic saturation during operation of the FMPMSM. According to one or more embodiments, the magnetization of the permanent magnets is adjustable to less than 20% magnetic saturation during operation of the FMPMSM. According to one or more embodiments, the magnetization of the permanent magnets is adjustable to greater than 70% magnetic saturation during operation of the FMPMSM.

One or more embodiments are directed to an FMPMSM having a derived internal voltage. The FMPMSM comprises: an annular stator having a winding; a rotor disposed concentric with the stator; a power inverter for dispensing a current pulse, wherein the power inverter has a voltage ($V_{ps}$) greater than the derived internal voltage; and an air gap between the stator and rotor. The rotor comprises: at least two circumferentially magnetized permanent magnets, each of the permanent magnets having two poles normal to an air gap between the stator and rotor; and a flux adjuster between the two poles of each of the permanent magnets. A magnetic flux density in the air gap is controllable by applying at least one current pulse from the power inverter to vary a polarization of magnetization of at least one of the permanent magnets at a first speed of the FMPMSM. The derived internal voltage limits a relationship between the magnetization state of the at least one permanent magnet and the first speed of the FMPMSM. According to one or more embodiments, the magnetic flux density in the FMPMSM is controllable during operation of the FMPMSM.

One or more embodiments are directed to a method of operating an FMPMSM comprising: an annular stator having a winding; a rotor disposed concentric with the stator; and a power inverter for dispensing an excitation current and at least one current pulse. The rotor comprises: at least two circumferentially magnetized permanent magnets, each of the permanent magnets having two poles normal to an air gap between the stator and rotor; and one or more flux adjusters adjacent to one or more poles of at least one of the permanent magnets. The method comprises: selecting a desired operational parameter having a first value; applying at least one current pulse from the inverter to set a magnetic flux linkage between the rotor and stator to achieve the first value of the desired operational parameter; selecting a second value of the desired operational parameter; and achieving the second value of the desired operational parameter by applying at least one second current pulse to adjust the magnetic flux linkage to a magnetization state corresponding to the second value.

According to one or more embodiments, the operational parameter is selected from a group consisting of: velocity; acceleration; magnetic regeneration; operating efficiency; and energy consumption.

One or more embodiments are directed to a method of operating an FMPMSM, the FMPMSM comprising: an annular stator having a winding; a rotor disposed concentric with the stator; and a power source controllable by an inverter for dispensing an excitation current and at least one current pulse, the inverter having a microcontroller. The rotor comprises: at least two circumferentially magnetized permanent magnets, each of the permanent magnets having two poles normal to an air gap between the stator and rotor; and a flux barrier between the poles of each of the permanent magnets. The method comprises: selecting a desired operational parameter having a first value; specifying a permissible range for the operational parameter; applying at least one first current pulse from the inverter to set a magnetic flux linkage between the rotor and stator to achieve the first value of the desired operational parameter; selecting a second value of the desired operational parameter; and applying at least one second current pulse from the inverter to adjust the magnetic flux linkage to a magnetization state corresponding to the second value. A difference between the first value and second value is within the specified permissible range for the operational parameter. According to one or more embodiments, adjusting the magnetic flux linkage further comprises the microcontroller referring to a look-up table to control the at least one second current pulse.

One or more embodiments are directed to a real-time FMPMSM comprising a rotor with circumferentially magnetized permanent magnets, wherein the permanent magnets have a coercivity of less than 2000 Oe (150 kAmp/m).

One or more embodiments are directed to a method of regulating magnetic polarization of permanent magnets in a real-time FMPMSM using at least one current pulse having a duration of less than 3 ms. According to one or more embodiments, the duration of the current pulse is less than 1.5 ms. According to one or more embodiments, the duration of the current pulse is less than 0.5 ms. According to one or more embodiments, the duration of every current pulse is less than 3 ms.

One or more embodiments are directed to a method of changing a magnetic flux density in an air gap between a stator and a rotor in a real-time FMPMSM comprising permanent magnets, the method comprising applying at least one current pulse to adjust a magnetic operating point of the magnets, wherein the at least one current pulse has a duration of less than 3 ms. According to one or more embodiments, the permanent magnets have a coercivity of less than 2000 Oe (150 kAmp/m).

While the invention has been described with respect to a limited number of embodiments, those skilled in the art, having benefit of this disclosure, will appreciate that other embodiments can be devised which do not depart from the scope of the invention as disclosed herein. Various changes and modifications can be made herein without departing from the scope of the invention as defined in the attached claims. Every feature that is unique from the prior art, alone or in combination with other features, should be considered a separate description of further inventions by the applicant. The foregoing descriptions of embodiments are provided for illustration purposes. Accordingly, the scope of the invention should be limited only by the attached claims.

The invention claimed is:

1. A flux-mnemonic permanent magnet synchronous machine (FMPMSM) comprising:
   an annular stator having a winding;
   a rotor disposed concentric with the stator, the rotor comprising: at least two circumferentially magnetized adjustable permanent magnets, each of the permanent magnets having two poles normal to an air gap between the stator and rotor; and one or more flux adjusters adjacent to one or more magnet poles of the permanent magnets; and
   a power inverter for dispensing an excitation current and at least one current pulse,
   wherein a polarization ratio of magnetization of at least one of the permanent magnets is adjustable during operation of the FMPMSM by application of the at least one current pulse, and
   wherein a magnetic flux density in the air gap is controlled during operation of the FMPMSM by adjusting the polarization ratio of the at least one permanent magnet.

2. The FMPMSM of claim 1, wherein a magnetic flux density in the air gap is influenced by adjusting the polarization ratio of the at least one permanent magnet by dispensing the at least one current pulse.

3. The FMPMSM of claim 1, wherein the at least one permanent magnet has a coercivity of less than 2000 Oe (150 kAmp/m).

4. The FMPMSM of claim 1, wherein the circumferentially magnetized permanent magnets have a coercivity of less than 2000 Oe (150 kAmp/m).

5. The FMPMSM of claim 1, wherein the circumferential magnetization of the permanent magnets is varied by applying the at least one current pulse having a duration of less than 3 ms.

6. The FMPMSM of claim 5, wherein a duration of the at least one current pulse is less than 1.5 ms.

7. The FMPMSM of claim 6, wherein a duration of the at least one current pulse is less than 0.5 ms.

8. The FMPMSM of claim 3, wherein a length of each of the permanent magnets is more than 50% of a circumferential length of a d-axis magnetic pole between the at least two permanent magnets.

9. The FMPMSM of claim 1, wherein the magnetization of the permanent magnets is adjustable to less than 40% magnetic saturation during operation of the FMPMSM.

10. The FMPMSM of claim 9, wherein the magnetization of the permanent magnets is adjustable to less than 20% magnetic saturation during operation of the FMPMSM.

11. The FMPMSM of claim 1, wherein the magnetization of the permanent magnets is adjustable to greater than 70% magnetic saturation during operation of the FMPMSM.

12. A flux-mnemonic permanent magnet synchronous machine (FMPMSM) having a derived internal voltage, the FMPMSM comprising:
    an annular stator having a winding;
    a rotor disposed concentric with the stator, the rotor comprising: at least two circumferentially magnetized adjustable permanent magnets, each of the permanent magnets having two poles normal to an air gap between the stator and rotor; and a flux adjuster between the two poles of each of the permanent magnets;
    a power inverter for dispensing a current pulse, wherein the power inverter has a voltage ($V_{ps}$) greater than the derived internal voltage; and
    an air gap between the stator and the rotor, wherein a magnetic flux density in the air gap is controllable by applying at least one current pulse from the power inverter to vary a polarization of magnetization of at least one of the permanent magnets at a first speed of the FMPMSM, and
    wherein the derived internal voltage limits a relationship between the magnetization state of the at least one permanent magnet and the first speed of the FMPMSM.

13. The FMPMSM of claim 12, wherein a magnetic flux density is controllable during operation of the FMPMSM.

14. A method of operating a flux-mnemonic permanent magnet synchronous machine (FMPMSM), the FMPMSM comprising:
    an annular stator having a winding;
    a rotor disposed concentric with the stator, the rotor comprising: at least two circumferentially magnetized adjustable permanent magnets, each of the permanent magnets having two poles normal to an air gap between the stator and rotor; and one or more flux adjusters adjacent to one or more poles of at least one of the permanent magnets; and
    a power inverter for dispensing an excitation current and at least one current pulse;
    the method comprising:
    selecting a desired operational parameter having a first value;
    controlling a magnetic flux density in the air gap, during operation of the FMPMSM, by adjusting a polarization ratio of magnetization of the at least one permanent magnet;
    applying at least one current pulse from the inverter to adjust the polarization ratio of magnetization of the at least one permanent magnet during operation of the FMPMSM and to set a magnetic flux linkage between the rotor and stator to achieve the first value of the desired operational parameter;
    selecting a second value of the desired operational parameter;
    and achieving the second value of the desired operational parameter by applying at least one second current pulse to adjust the magnetic flux linkage to a magnetization state corresponding to the second value.

15. The method of claim 14, wherein the desired operational parameter is selected from a group consisting of: velocity; acceleration; magnetic regeneration; operating efficiency; and energy consumption.

16. A method of operating a flux-mnemonic permanent magnet synchronous machine (FMPMSM), the FMPMSM comprising:
- an annular stator having a winding;
- a rotor disposed concentric with the stator, the rotor comprising: at least two circumferentially magnetized adjustable permanent magnets, each of the permanent magnets having two poles normal to an air gap between the stator and rotor; and a flux barrier between the poles of each of the permanent magnets; and
- a power source controllable by an inverter for dispensing an excitation current and at least one current pulse, the inverter having a microcontroller;

the method comprising:
- selecting a desired operational parameter having a first value,
- specifying a permissible range for the operational parameter,
- controlling a magnetic flux density in the air gap, during operation of the FMPMSM, by adjusting a polarization ratio of magnetization of at least one of the permanent magnets;
- applying at least one first current pulse from the inverter to adjust the polarization ratio of magnetization of the at least one permanent magnet during operation of the FMPMSM and to set a magnetic flux linkage between the rotor and stator to achieve the first value of the desired operational parameter,
- selecting a second value of the desired operational parameter,
- applying at least one second current pulse from the inverter to adjust the magnetic flux linkage to a magnetization state corresponding to the second value,
- wherein a difference between the first value and second value is within the specified permissible range for the operational parameter.

17. The method of claim 16, wherein adjusting the magnetic flux linkage further comprises the microcontroller referring to a look-up table to control the at least one second current pulse.

18. The method of claim 14, wherein a duration of at least one of the first or second current pulses is less than 1.5 ms.

19. The method of claim 14, wherein a duration of at least one of the first or second current pulses is less than 0.5 ms.

20. The method of claim 14, wherein a duration of every current pulse applied from the inverter is less than 3 ms.

21. The method of claim 14, wherein the permanent magnets have a coercivity of less than 2000 Oe (150 kAmp/m).

* * * * *